(12) United States Patent
Wibbeler et al.

(10) Patent No.: US 11,441,038 B2
(45) Date of Patent: Sep. 13, 2022

(54) METHOD FOR PELLETIZING CARBON BLACK RECLAIMED FROM WASTE TIRES

(71) Applicant: Bolder Industries, Boulder, CO (US)

(72) Inventors: William Anthony Wibbeler, Boulder, CO (US); Nathaniel Cole Murphy, Boulder, CO (US)

(73) Assignee: WASTE TO ENERGY PARTNERS, LLC, Boulder, CO (US)

( * ) Notice: Subject to any disclaimer, the term of this patent is extended or adjusted under 35 U.S.C. 154(b) by 0 days.

(21) Appl. No.: 16/658,049

(22) Filed: Oct. 19, 2019

(65) Prior Publication Data

US 2020/0123390 A1 Apr. 23, 2020

Related U.S. Application Data

(60) Provisional application No. 62/778,208, filed on Dec. 11, 2018, provisional application No. 62/748,230, filed on Oct. 19, 2018.

(51) Int. Cl.
*C10B 53/07* (2006.01)
*C09C 1/48* (2006.01)
*C09C 1/58* (2006.01)

(52) U.S. Cl.
CPC .............. *C09C 1/482* (2013.01); *C09C 1/58* (2013.01); *C10B 53/07* (2013.01)

(58) Field of Classification Search
CPC ........... C10B 53/07; C09C 1/482; C09C 1/56; C09C 1/565; C09C 1/58; C09C 1/60
See application file for complete search history.

(56) References Cited

U.S. PATENT DOCUMENTS

| | | | |
|---|---|---|---|
| 2,511,088 A | 6/1950 | Whaley, Jr. | |
| 3,480,514 A | 11/1969 | Kinzler | |
| 3,671,613 A * | 6/1972 | Gotshall | C08K 3/04 264/115 |
| 3,978,199 A * | 8/1976 | Maruhnic | C09C 1/482 423/449.7 |

(Continued)

OTHER PUBLICATIONS

International Search Report and Written Opinion dated May 18, 2020 for related application PCT/US2019/065816 (10 pgs).

(Continued)

*Primary Examiner* — Jonathan Luke Pilcher
(74) *Attorney, Agent, or Firm* — Stinson LLP

(57) ABSTRACT

One variation for a method for converting tires into pelletized, recovered carbon black includes: shredding a set of tires into a volume of tire rubber segments, the set of tires selected from a group comprising an agricultural tire, a commercial vehicle tire, and a passenger tire; in a pyrolytic reactor, thermally depolymerizing the volume of tire rubber segments into a volume of carbonaceous material; comminuting the volume of carbonaceous material; removing from the volume of carbonaceous material agglomerates larger than the maximum agglomerate diameter; within a mixer, mixing the volume of carbonaceous material with a binding agent over a first interval, the mixer inducing formation of a set of pellets of a range of pellet diameters; drying the set of pellets within a dryer to a particular moisture content; and removing from the set of pellets a first subset of pellets larger than a maximum pellet size.

19 Claims, 12 Drawing Sheets

(56) References Cited

U.S. PATENT DOCUMENTS

| | | | | |
|---|---|---|---|---|
| 4,250,158 | A | * | 2/1981 | Solbakken .............. B29B 17/02 423/449.6 |
| 4,260,473 | A | | 4/1981 | Bauer |
| 4,284,616 | A | * | 8/1981 | Solbakken .............. B29B 17/02 201/2.5 |
| 4,647,443 | A | * | 3/1987 | Apffel .................... C09C 1/482 201/2.5 |
| 4,839,151 | A | * | 6/1989 | Apffel .................... C09C 1/482 201/19 |
| 5,037,628 | A | | 8/1991 | Fader |
| 5,057,189 | A | * | 10/1991 | Apffel .................... C09C 1/482 202/113 |
| 7,416,641 | B2 | | 8/2008 | Denison |
| 8,247,527 | B2 | | 8/2012 | Fader |
| 8,322,642 | B2 | | 12/2012 | Fader |
| 8,323,793 | B2 | | 12/2012 | Hamby et al. |
| 8,871,840 | B2 | | 10/2014 | Wong et al. |
| 9,139,738 | B2 | | 9/2015 | Hamby et al. |
| 9,487,659 | B2 | | 11/2016 | Pech et al. |
| 9,580,606 | B2 | | 2/2017 | Verberne et al. |
| 9,617,401 | B2 | | 4/2017 | Wong et al. |
| 10,119,031 | B2 | | 11/2018 | Verberne et al. |
| 2005/0023124 | A1 | | 2/2005 | Karpetsky et al. |
| 2005/0148487 | A1 | | 7/2005 | Brownscombre et al. |
| 2010/0206968 | A1 | | 8/2010 | Fader |
| 2010/0210782 | A1 | | 8/2010 | Fader |
| 2010/0249353 | A1 | | 9/2010 | MacIntosh et al. |
| 2010/0289270 | A1 | | 11/2010 | Behrens et al. |
| 2010/0292383 | A1 | | 11/2010 | Fader |
| 2010/0307380 | A1 | | 12/2010 | Fader |
| 2011/0200518 | A1 | | 8/2011 | MacIntosh et al. |
| 2013/0281581 | A1 | | 10/2013 | Wong et al. |
| 2014/0371385 | A1 | | 12/2014 | Verberne et al. |
| 2015/0045497 | A1 | | 2/2015 | Wong et al. |
| 2015/0125381 | A1 | | 5/2015 | Wong |
| 2015/0203765 | A1 | | 7/2015 | Kostura, III et al. |
| 2017/0114222 | A1 | | 4/2017 | Verberne et al. |
| 2020/0181501 | A1 | * | 6/2020 | Wibbeler ................ C10B 47/34 |

OTHER PUBLICATIONS

International Search Report and Written Opinion dated Jan. 16, 2020 for related application PCT/US2019/057096 (12 pgs).

Final Office Action dated Oct. 12, 2021 in related U.S. Appl. No. 16/711,368 (published as 2020/0181501), filed Dec. 11, 2019.

European Search Report dated Jun. 2, 2022 issued in related European Patent Application 10873622.5 filed on Mar. 13, 2019 (13 pgs).

Y. Hirata, et al., "Properties and applications of carbon black recovered from scrap tyres by pyrolysis", International Polymer Science and Technology, Rapra Technology, vol. 6, No. 4, Jan. 1, 1979, pp. 50-55 (6 pgs).

N. Antoniou, et al., "Experimental proof of concept for a sustainable End of Life Tyres pyrolysis with energy and porous materials production", Journal of Cleaner Production, vol. 101, Apr. 20, 2015, pp. 323-336 DOI: 10.1016/J.JCLEPRO.2015.03.101 (14 pgs).

K. Formela, et al., "Efficiency of thermo mechanical reclaiming of ground tire rubber conducted in counter-rotating and co-rotating twin screw extruder", Polimery, vol. 59, No. 03, Mar. 1, 2014, pp. 231-238 DOI: 10.14314/polimery.2014.231 (8 pgs).

Office Action dated Jun. 21, 2022 from the Canadian Intellectual Property Office for related Canadian Patent Application 3,116,891 filed on Oct. 19, 2019 (4 pgs).

Office Action 6523 dated May 4, 2022 from the Columbian Patent Office for related Colombian Patent Application NC2021/0006349 filed on Oct. 19, 2019 (8 pgs).

* cited by examiner

| FIRST DIGIT OF GRADE | EXAMPLE VIRGIN CARBON BLACK GRADE | TYPICAL AVERAGE PARTICLE SIZE, NANOMETERS |
|---|---|---|
| 1 | N100 | 11 to 19 |
| 2 | N200 | 20 to 25 |
| 3 | N330 | 26 to 30 |
| 4 | N400 | 31 to 39 |
| 5 | N500 | 40 to 48 |
| 6 | N660 | 49 to 60 |
| 7 | N762 | 61 to 100 |
| 8 | N800 | 101 to 200 |
| 9 | N900 | 201 to 500 |

US 11,441,038 B2

METHOD FOR PELLETIZING CARBON BLACK RECLAIMED FROM WASTE TIRES

CROSS-REFERENCE TO RELATED APPLICATIONS

This application claims the benefit of U.S. Provisional Application No. 62/748,230, filed on 19 Oct. 2018, and U.S. Provisional Application No. 62/778,208, filed on 11 Dec. 2018, both of which are incorporated in their entireties herein by this reference.

TECHNICAL FIELD

This invention relates generally to a process for reclaiming carbon black from waste tires, and more specifically to a new and useful method for processing and recycling waste tires, and pelletizing carbon black reclaimed from waste rubber materials.

DESCRIPTION OF THE EMBODIMENTS

The following description of the embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
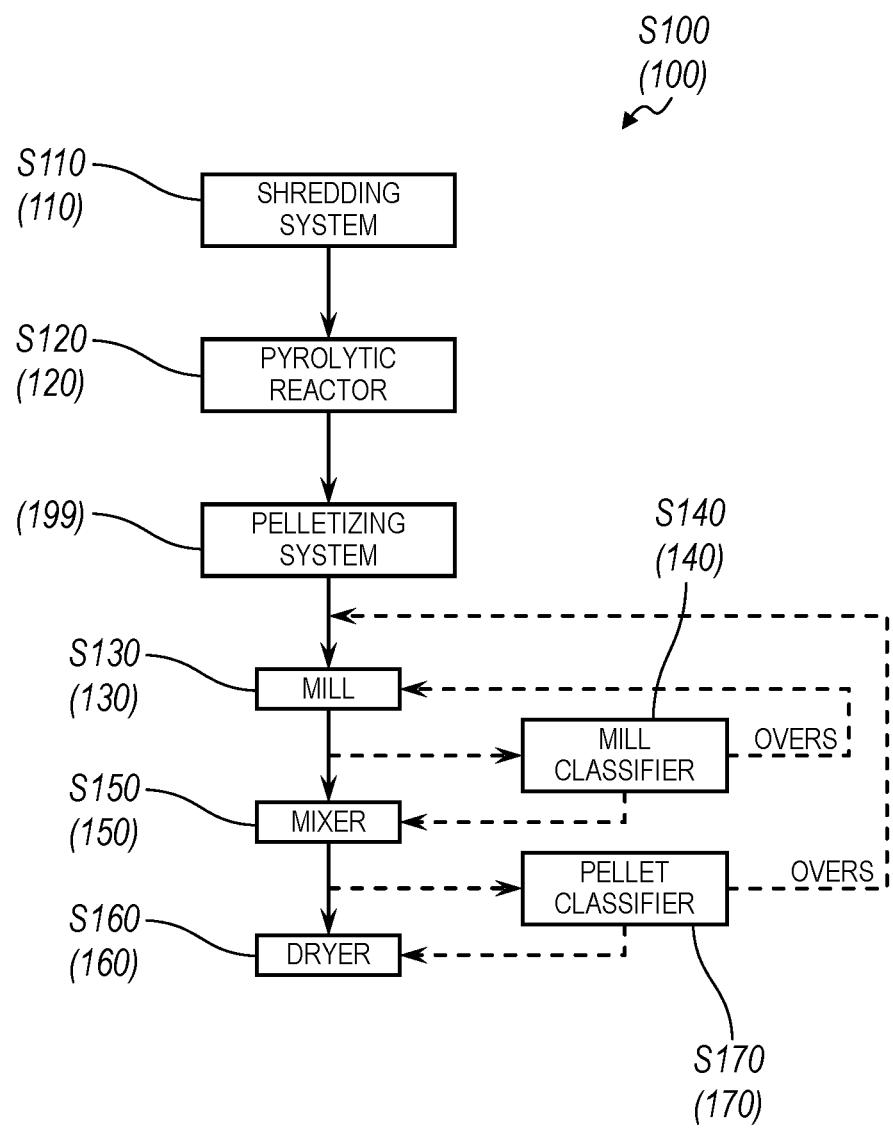
FIG. 1 is a flowchart representation of one implementation of a method.

As shown in FIG. 1, a method S100 for converting tires (e.g. scrap or waste tires) into pelletized, recovered carbon black includes: in Block S110, shredding a set of tires 101 selected from a group including an agricultural tire, a commercial tire, and a passenger tire into a volume of tire rubber segments 105; in Block S120, in a pyrolytic reactor 120, thermally depolymerizing the volume of tire rubber segments 105 within an inert atmosphere into a set of pyrolytic byproducts including a volume of carbonaceous material 190 including agglomerates of carbonaceous aggregates; in Block S130, comminuting the volume of carbonaceous material 190 to reduce a diameter of an agglomerate within the volume of carbonaceous material 190 to less than a maximum agglomerate diameter; in Block S140, removing from the volume of carbonaceous material 190 agglomerates larger than the maximum agglomerate diameter; in Block S150, within a mixer 150, mixing the volume of carbonaceous material 190 with a binding agent over a first interval, the mixer 150 inducing formation of a set of pellets 195 in Block S154; in Block S160, drying the set of pellets 195 within a dryer 160 to a particular moisture content over a second interval defined by a rate the set of pellets 195 translates across a length of the dryer 160 and by an operating temperature of the dryer 160; and, in Block S170, removing from the set of pellets 195 a subset of pellets 195 larger than a maximum pellet size.

One variation of the method S100 includes: shredding a set of tires 101 selected from a group including an agricultural tire, a commercial tire, and a passenger tire into a volume of tire rubber segments 105, a volume of steel wire 106, and a volume of textile fiber 103; in Block S122, in a pyrolytic reactor 120, thermally depolymerizing the volume of tire rubber segments 105 within an inert atmosphere into a set of pyrolytic byproducts including a volume of carbonaceous material 190, a volume of oil 123, and a volume of gas, the volume of carbonaceous material 190 including agglomerates of carbonaceous aggregates; in Block S130, comminuting the volume of carbonaceous material 190 to reduce a diameter of an agglomerate within the volume of carbonaceous material 190 to less than a maximum agglomerate diameter; within a mixer 150: in Block S152, spraying the volume of carbonaceous material 190 with a binding agent, and, in Block S154, mixing the volume of carbonaceous material 190 over a first interval, the mixer 150 inducing formation of a set of pellets 195 of a range of pellet diameters, the first interval defined by a length of the mixer 150 and a feed rate of a retort translating the set of pellets within the mixer 150; in Block S160, drying the set of pellets 195 within a dryer 160 to a particular moisture content over a second interval defined by a rate the set of pellets 195 translates across a length of the dryer 160 and operating temperature of the dryer 160, the rate the set of pellets 195 translates across the length of the dryer 160 defined by an angle between a plane of the length of the dryer 160 and a horizontal plane; in Block S170, removing from the set of pellets 195 a first subset of pellets 195 larger than a maximum pellet size; and, in Block S172, removing from the set of pellets 195 a second subset of pellets 195 smaller than a minimum pellet size.

2. Applications

Roughly 400 million tires enter landfills each year in the United States. Due to limited availability of recycling processes for these tires, landfills are filled with an ever-increasing number of tires. Existing tire recycling processes typically extract and recycle a small percentage of available recyclable products within tires. To facilitate recycling of tires and limit overall waste generated as a result of recycling tires, a system 100 can implement a method S100 to extract and recycle carbonaceous material (i.e., organic material that includes elemental carbon) from tires and/or scrap rubber to form reclaimed carbon black, which is a recycled material that can be implemented in applications such as plastic pigmentation, plastic compounding, rubber compounding, and tire manufacture. Generally, reclaimed carbon black can act as a semi-reinforcing filler in rubber applications and a pigment in plastics masterbatching applications.

The method S100 can be implemented by a system 100 that includes a tire-shredding system 110, a pyrolytic reactor 120, and a pelletizing system 199 that includes a mill 130, a mixer 150, a dryer 160, and a pellet classifier 170. The method S100 can be implemented to convert tires (e.g., waste tires recycled by an end-user or tire distributor and/or scrap tires recycled by a manufacturer) into pelletized carbonaceous material (i.e., carbon black) for use as a filler, colorant, and/or semi-reinforcing agent in rubber and/or plastics applications. In particular, the method S100 includes shredding a set of tires 101 into tire rubber segments, steel wire (i.e., used for reinforcement of the tire), and textile (e.g., nylon) fiber in order to substantially isolate tire rubber from other inorganic components of each tire prior to pyrolysis. Then, the volume of tire rubber segments 105 can enter an inlet of the pyrolytic reactor 120 to undergo pyrolysis (i.e., thermal decomposition in an inert atmosphere). Generally, the volume of tire rubber segments 105 includes rubber polymers (e.g., Natural Rubber), various virgin carbon black grades (e.g., Moo, N330, N660, and N762), tire reinforcing agents (e.g., silicon dioxide or "silica"), zinc oxide, vulcanization agents (e.g., sulfur), stearic acid, and/or other rubber additives (e.g., dispersion agents and/or curing agents). During pyrolysis, the volume of tire rubber segments 105 depolymerizes to form pyrolytic byproducts, such as pyrolytic oil, synthetic gas (hereinafter "syngas"), and recovered carbonaceous material (i.e., "recovered carbon black" or "reclaimed carbon black"). The recovered carbonaceous material includes agglomerates of aggregated carbon black particles that enclose (i.e., in a matrix) other materials and additives found in the tire rubber. For example, agglomerates of carbon aggregates can surround and encapsulate silica particles, zinc oxide particles, and/or calcium. In this example, a surface of the silica can be partially exposed such that the silica exhibits some effect on the recovered carbonaceous material's performance in rubber applications. However, due to encapsulation of the silica during pyrolysis, the silica may exhibit decreased exposed surface area relative to unencapsulated, virgin silica and, therefore, the silica exhibits different and/or less reinforcing effects in rubber applications.

The system 100 can then pelletize the recovered carbonaceous material into a set of (discrete) pellets 195. During pelletization, the system 100 can mill the recovered carbonaceous material into a powder of particles within a particular agglomerate size distribution to create a volume of carbonaceous agglomerates of substantially similar sizes. Therefore, the system can limit clumping and surface imperfections when implemented into rubber and plastics due to varying agglomerate sizes that exit the pyrolytic reactor 120. The system 100 can then mix the powder with a binding agent to induce clumping (or "pellet agglomeration") of the powder into discrete pellets 195 within a mixer 150. The set of pellets 195 can then be dried and classified to remove over- and undersized subset of pellets 195 from the set of pellets 195. Oversized and/or undersized subset of pellets 195 can be recycled back into the mill 130, where the mill 130 can grind the pellets 195 and mix the (formerly agglomerated) subset pellets 195 in with the powder to be repelletized.

The system 100 can be implemented to control quality, quantity, and consistency of products (e.g., the set of pellets 195) output by the system 100 by controlling and implementing methods—like method S100—to control the composition of the volume of tire rubber segments 105 that enters the system 100 despite general variability in tires used as feedstock due to variability in tire composition across the tire manufacturing industry. By controlling a composition of the volume of tire rubber segments 105 (feedstock), the system 100 can maintain carbon particle size and a narrow distribution of compositions (e.g., carbon, sulfur, and zinc oxide) output by the system 100. Generally, tires include a mixture of rubber and other polymers, various grades of virgin carbon black, steel, nylon fiber, and other materials such as curing agents (e.g., zinc oxide), dispersion agents, and other rubber additives. Composition of tires varies significantly amongst manufacturers, tire type (e.g., consumer tires, agricultural tires, mining tires, over-the-road (OTR) tires), country of manufacture, and intended use condition (e.g., winter tires). For example, tires manufactured and sold in Europe tend to include higher silica (silicon dioxide or "SiO2") content than tires manufactured and sold in the United States. Additionally, the shredding system 110 can separate tire rubber from other components of the tire, such as steel wire and nylon fiber. Due to bonding among the tire rubber, the steel wire, and the nylon fiber, residue of steel and nylon may remain bonded to the tire rubber and, thus, may enter the pyrolytic reactor 120 and remain present in the volume of carbonaceous material 190 output by the pyrolytic reactor 120. Additionally, the shredding system 110 can shred and/or segment the tire rubber into rubber shreds or pieces, which can be transferred (or conveyed) into the pyrolytic reactor 120.

Figure 4:
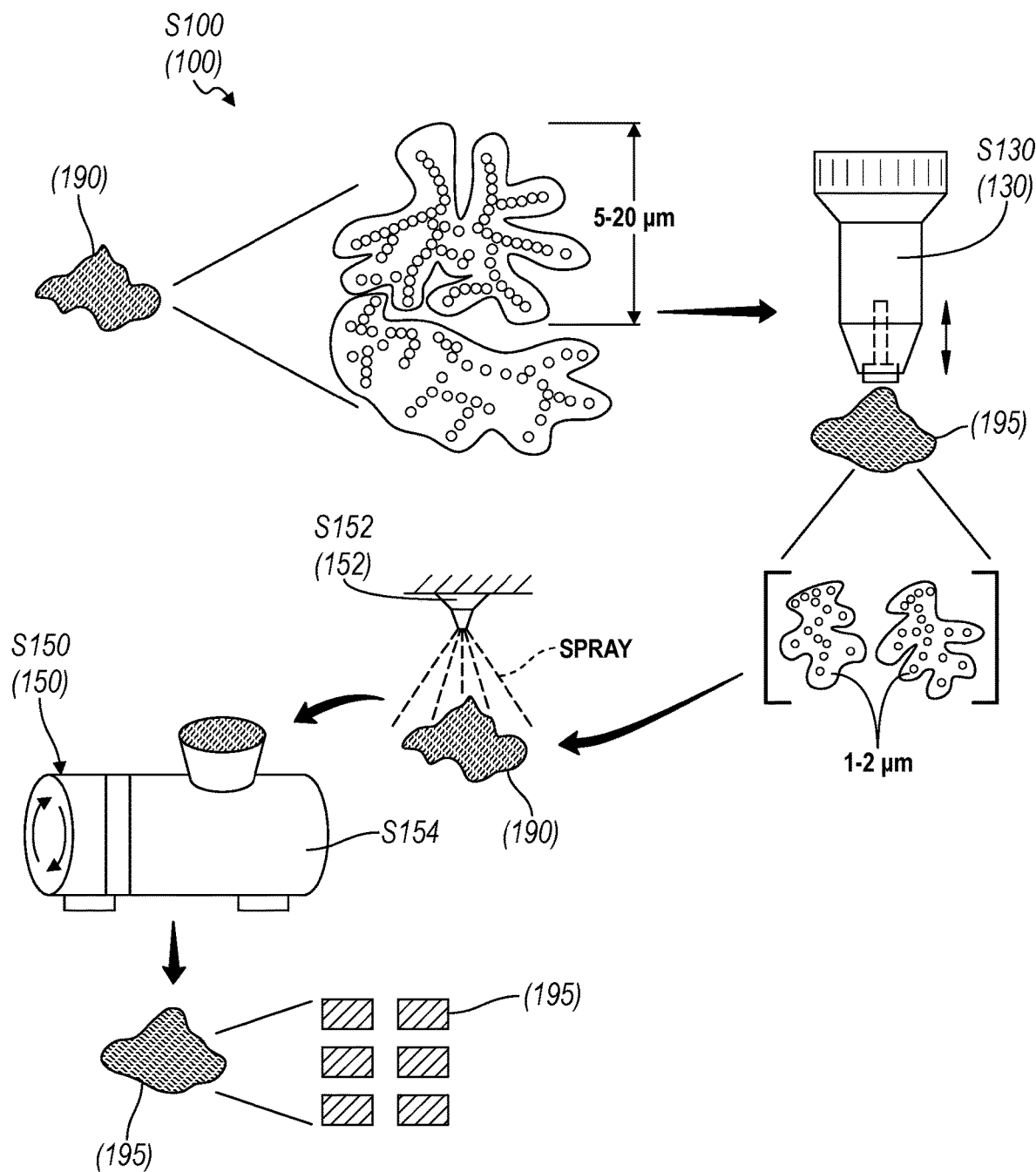
FIG. 4 is a flowchart representation of one implementation of a variation of the method.
Figures 12, 13:
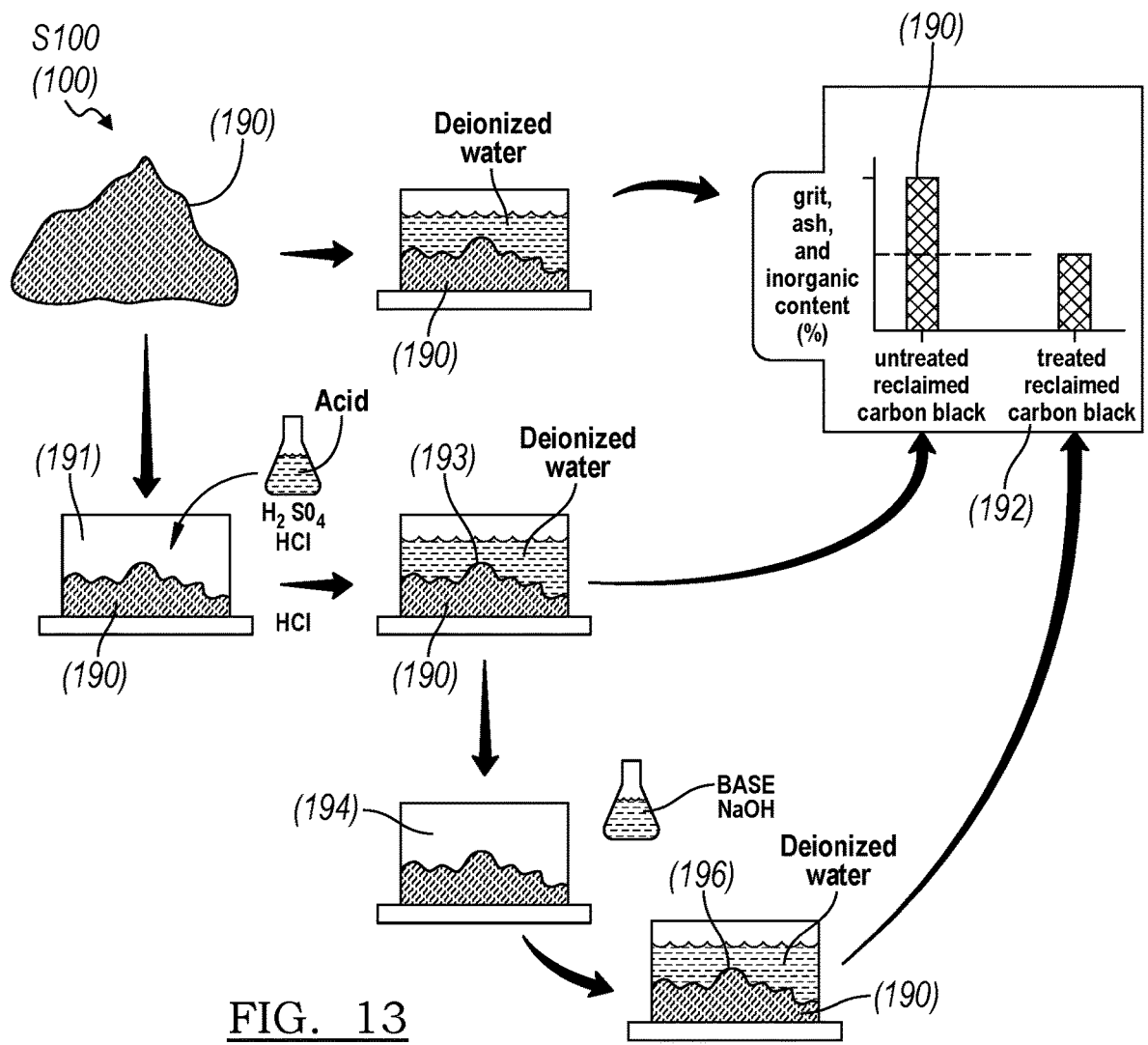
FIG. 12 is a schematic representation of one implementation of the method.
FIG. 13 is a flowchart representation of one implementation of the method.

Each tire can also contain multiple grades of carbon black, wherein each grade is defined by the surface area of a particle of carbon black as shown in FIG. 12. For example, tires can include various grades of virgin carbon black, such as N100, N330, N660, N762, or N900. Each of these grades is defined by an average particle size of carbon within the virgin carbon black grade. As shown in FIG. 4, Moo series virgin carbon black grade includes an average particle size between 11 to 19 nanometers; a N200 series virgin carbon black grade includes an average particle size between 20 to 25 nanometers; a N300 series virgin carbon black grade includes an average particle size between 25 to 30 nanometers; and a N600 series virgin carbon black grade includes an average particle size between 49 to 60 nanometers. Due to the varying particle size and surface activity of virgin carbon black grades that enter the pyrolytic reactor 120, the volume of carbonaceous material 190 typically exhibits similar properties (e.g., dispersion, tensile strength trends, and/or other physical properties when incorporated into rubber) of each of the virgin carbon black grades that is present within the set of tires 101 that enter the pyrolytic reactor 120. Therefore, the volume of carbonaceous material 1090 acts as a composite grade of carbon black. For example, when incorporated into rubber, the carbonaceous material may act as a composite grade of carbon black with reinforcing properties similar to a N600 series virgin carbon black grade and tinting properties similar to a N330 series virgin carbon black grade as a result of presence of both N600 series virgin carbon black grade and N330 series virgin carbon black grade within the volume of tire rubber. In this manner, the system 100 can control the composition of tire rubber in order to control the grade composition and performance characteristics of the volume of carbonaceous materials when implemented into rubber and plastics applications.

As shown in FIG. 4, the volume of carbonaceous material 190 is defined by particles of carbon black (i.e., a form of paracrystalline carbon) between ten nanometers and 500 nanometers in diameter. These carbon black particles can aggregate to form carbonaceous aggregates including chemical bonds, van der Waal forces, and cross-linking between carbon black particles as shown in FIG. 4. The carbonaceous aggregates can agglomerate to form carbonaceous (or "carbon black") agglomerates larger than one micrometer as shown in FIG. 4. These carbon black agglomerates include relatively weak chemical bonds, which can be broken by mechanical forces, such as by milling or grinding. Carbon black agglomerates can be mixed with binding agents and dispersion agents to facilitate bonding and mixing with other materials, such as plastics. Generally, reclaimed carbon black agglomerates, such as those found in the volume of carbonaceous material, are larger than virgin carbon black agglomerates (i.e., carbon black manufactured directly from oil and other raw materials rather than from recycled rubber extracted from recycled materials, such as waste tires). Due to lower surface activity and/or lower surface area of reclaimed carbon black agglomerates, reclaimed carbon black agglomerates may disperse less uniformly and consistently when mixed with other materials than virgin carbon black agglomerates. However, the system 10o can execute the method S100 to control (and/or reduce) agglomerate size of reclaimed carbon black, thereby improving dispersion and cross-linking with other materials. For example, by controlling and refining the agglomerate size of reclaimed carbon black agglomerates through control of rubber feedstock, the system 100 can be configured to produce agglomerates smaller than one micrometer in order to replicate high-grade filler carbon blacks (e.g., N600 and N700 series) for effective use in reinforcing and filler applications.

Due to varying compositions, agglomerates of the recovered carbonaceous material vary in size and surface area; such variability can result in surface imperfections in rubber and plastics applications. Additionally, agglomerates of the recovered carbonaceous material can vary in composition, which can result in different performance effects (e.g., dispersion, tint strength, tensile strength, and/or durometer) when implemented into rubber and plastics applications. Therefore, following pyrolysis, the recovered carbonaceous material is input into a mill 130 or other grinding or comminuting system to be ground down to a particular agglomerate size range or particular agglomerate size distribution. Additionally or alternatively, during the milling process, the system 100 can apply steam to the recovered carbonaceous material to increase surface activity and/or a nitrogen surface area of agglomerates of recovered carbonaceous material, thereby increasing cross-linking with other materials and improving reinforcement properties of the recovered carbonaceous material in rubber applications.

However, in powder form, the recovered carbonaceous material is difficult to transport and mix into rubber applications, which can be <1 micrometer in diameter. In pellet form, the recovered material transports more easily while minimizing airborne powder dispersion that may contaminate other areas of a manufacturing facility, environmentally protected areas (e.g., groundwater), etc. To pelletize the recovered carbonaceous material, in a mixer 150, a spray nozzle 152 can wet the recovered carbonaceous material with a binding agent (e.g., water, toluene, and/or mineral oil) while the mixer 150 mixes the binding agent and recovered carbonaceous material into a substantially homogenous mixture that agglomerates (or "clumps") into pellets 195 of the recovered carbonaceous material. The pellets 195 can then be dried to a particular moisture content (e.g., <1%). By reducing the moisture content of the pellets 195, the system 100 can prevent introduction of undesired moisture into rubber mixing that may contribute to gas emissions (or "off-gassing") that are emitted when the pellets 195 are heated within a rubber mixer and/or plastic masterbatching mixer. These gas emissions can carry toxic components, such as polycyclic aromatic hydrocarbons (i.e., PAH), into the air of a manufacturing facility when residual moisture within the agglomerates evaporate under heat.

Reclaimed carbonaceous material (i.e., reclaimed carbon black) is one product that can be extracted during tire recycling; reclaimed carbon black can be produced by thermally decomposing (i.e., pyrolyzing) carbonaceous petroleum-derived materials like virgin carbon black extracted from recycled rubber materials, such as car tires, truck tires, and/or other tires during pyrolysis. Other materials that can be extracted and recycled from waste tires include oil, solvents (distilled from the oil), steel, syngas, nylon fiber, etc.

While the systems and methods described herein relate to recycling of tire rubber, the method S100 can be implemented to recycle other polymeric materials, such as industrial rubber (e.g., industrial hoses, belts, commercial roofing), elastomers, and plastics (e.g., black or clear plastic bottle). Additionally, the system 100 can include any other components or systems configured to depolymerize polymeric materials, such as tire rubber, in addition to or in replacement of the pyrolytic reactor 120.

3. System

Figure 2:
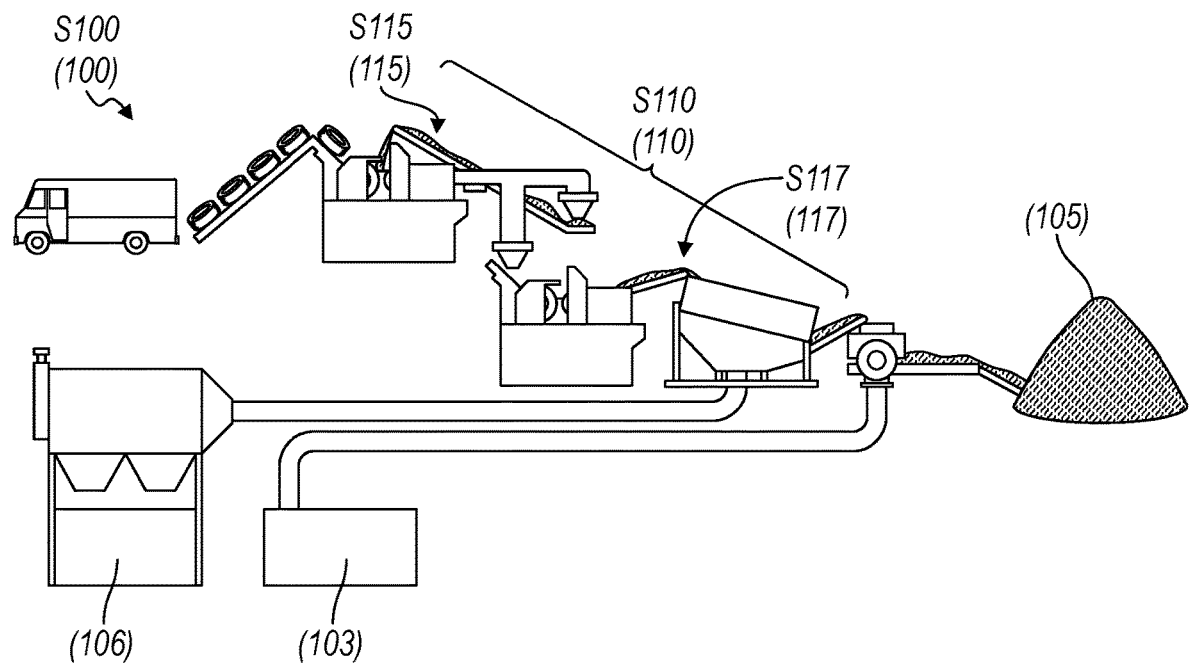
FIG. 2 is a schematic representation of one implementation of the method.

A system 100, shown in FIGS. 1 and 2, for converting tires into pelletized, recovered carbon black includes: a primary tire shredder 115 configured to shred a set of tires 101 selected from a group including an agricultural tire, a commercial tire, and a passenger tire into a volume of tire rubber segments 105, a volume of steel wire 106, and a volume of textile fiber 103 in Block S115; a secondary tire shredder 117 configured to shred the volume of tire rubber segments 105 of tire rubber of a desired surface area range configured to pyrolyze substantially uniformly in Block S117; a pyrolytic reactor 120 configured to thermally depolymerize the volume of tire rubber segments 105 within an inert atmosphere into a set of pyrolytic byproducts including a volume of carbonaceous material 190 including agglomerates of carbonaceous aggregates in Block S120; a mill 130 configured to comminute the volume of carbonaceous material 190 to a diameter of an agglomerate within the volume of carbonaceous material 190 to less than a maximum agglomerate diameter in Block S130. In Block S150 of the method S100, the system 100 also includes a mixer 150 including: a spray nozzle 152 configured to spray the volume of carbonaceous material 190 with a binding agent in Block S152; a retort configured to: mix the volume of carbonaceous material 190 and the binding agent and translate the volume of carbonaceous material 190 across a length of the mixer 150; and form a set of pellets 195 of a range of pellet diameters. Additionally, the system 100 includes: a dryer 160 configured to dry the set of pellets 195 within a dryer 160 to a particular moisture in Block S160 of the method S100; and a pellet classifier 170 configured to remove from the set of pellets 195 a subset of pellets 195 larger than a maximum pellet size proportional to a maximum pellet hardness defined by a desired dispersion coefficient of the set of pellets 195 within a volume of rubber polymer in Block S170 of the method S100.

Figure 8:
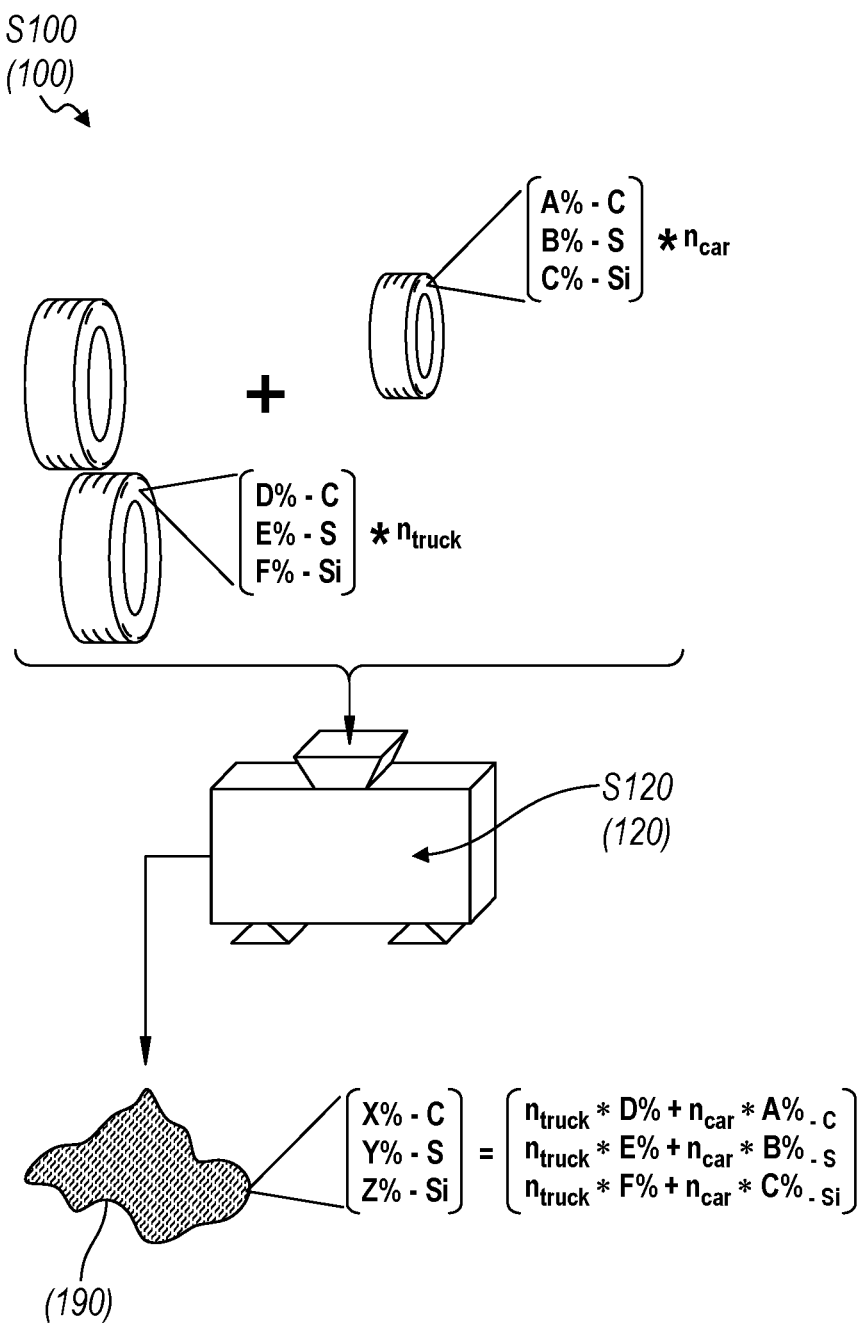
FIG. 8 is a flowchart representation of one implementation of the method.

Generally, the system 100 is configured to accept and shred a set of whole tires selected to yield a particular composition of tire rubber and pyrolyze the volume of tire rubber into a volume of carbonaceous material 190 of a compositional proportional to the composition of the tire rubber as shown in FIG. 8. The system 100 then can pelletize the volume of carbonaceous material 190 into a set of pellets 195, which can be implemented for use in rubber and plastics applications. In particular, the system 100 is configured to take in waste (or scrap) whole tires, separate tire rubber in the tires from textile (i.e., nylon) fiber and steel wire contained within the tires, shred the tire rubber into approximately uniform sections to form a volume of tire rubber segments 105, feed the volume of tire rubber segments 105 into a pyrolytic reactor 120 where the volume of tire rubber segments 105 depolymerizes into a volume of carbonaceous material 190, and then pelletize the volume of carbonaceous material 190 by: milling the carbonaceous material into a powder, mixing the powder with a binding agent, and agglomerating and drying the powder and binding agent mixture. For quality control, a pellet classifier can separate and recycled over- and undersized pellets from the set of pellets to create a narrow distribution of pellet sizes.

3.1 Shredding System

Figure 5:
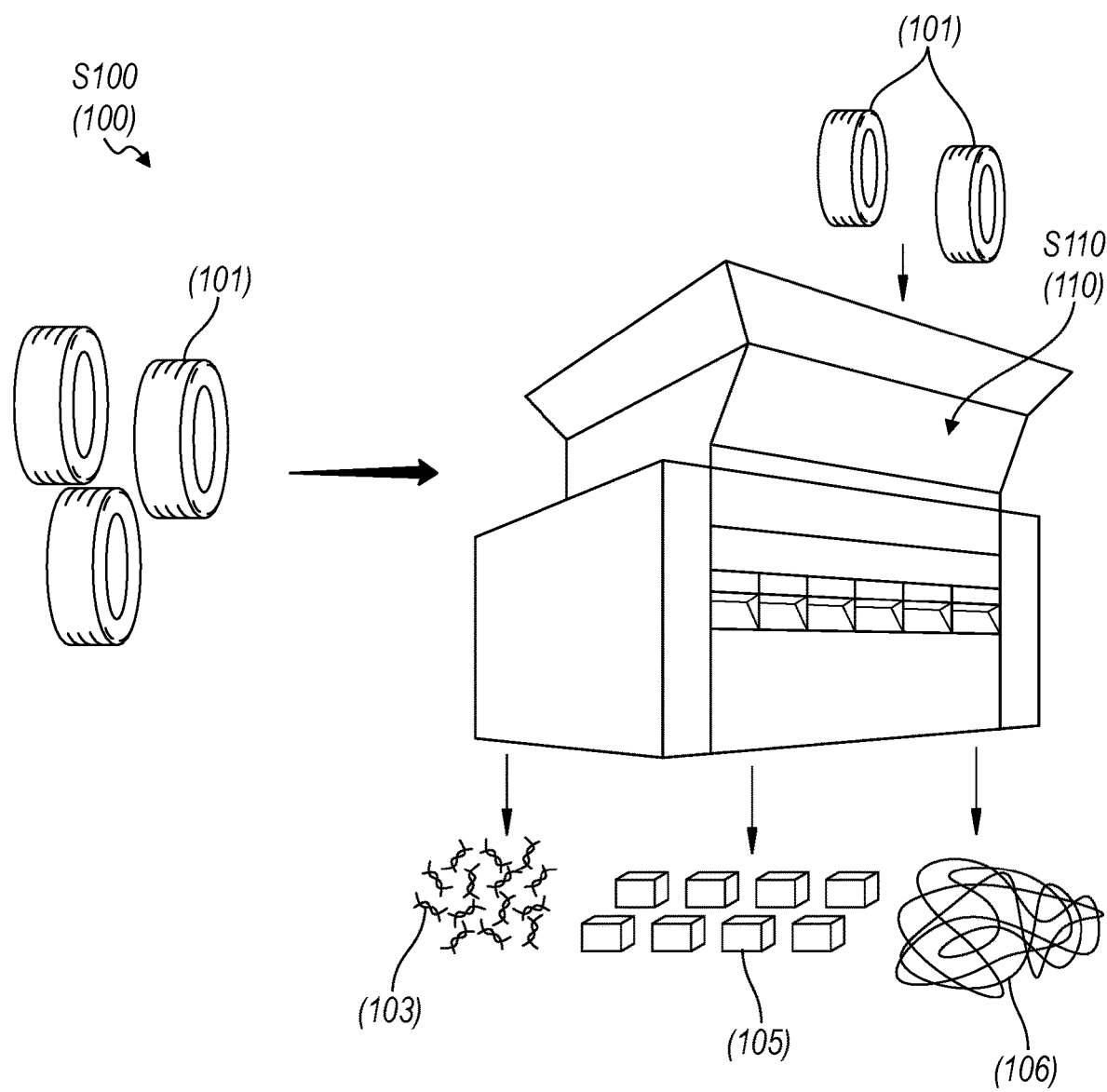
FIG. 5 is a flowchart representation of one implementation of the method.

In one implementation shown in FIGS. 2, 5, and 8, the system 100 can include a shredding system no configured to shred_a set of tires 101 selected from a group including an agricultural tire, a commercial tire, and a passenger tire into a volume of tire rubber segments 105 including a set of virgin carbon black grades, a set of rubber polymers, a set of rubber additives in Block Silo. Generally, the shredding system 110 is configured to receive a feed of waste tires (e.g., from cars, trucks, tractors, other agricultural vehicles), separate constituent materials of the waste tires and remove a volume of tire rubber from steel wire and other materials (e.g., nylon or synthetic fibers) within the waste tires, segment the volume of tire rubber into segments (or "chips"), and deliver the volume of tire rubber segments to a pyrolytic reactor 120 for pyrolysis, as described below and shown in FIG. 2. The system 100 includes the shredding system 110 (or feedstock processing system) configured to shred and pre-process waste tires to deliver reclaimed tire rubber extracted from waste tires and separated from other materials within waste tires to a pyrolytic reactor 120 for pyrolysis. The volume of tire rubber segments can be shredded to a size optimized for substantially uniform decomposition during pyrolysis. Additionally, the system 100 is configured to deliver a particular composition of feedstock (tire rubber) to the pyrolytic reactor 120 to produce a particular composition of carbonaceous material configured to attain particular properties when implemented in rubber and plastics.

In particular, the system 100 can include a conveyor configured to deliver a feed of (waste) tires (i.e., the set of tires) to a shredding system 110. The set of tires can include a proportioned mixture of car tires, truck (i.e., commercial, over the road, or "OTR") tires, and other tires, such as agricultural tires and mining tires. Generally, tires include organic (or carbonaceous) materials and inorganic (or non-carbonaceous) materials. The organic materials can include carbon black and polymer(s) from the tire rubber. In particular, carbon black in the volume of tire rubber segments 105 can include a multitude of carbon black grades varying in surface areas, particle diameters, and particle distributions. For example, the volume of tire rubber segments 105 can include a set of carbon black grades extracted from tire treads (e.g., N100), from tire sidewalls (e.g., N660), and from tire carcasses (e.g., N900). The inorganic materials can include a set of rubber additives, such as zinc oxide, sulfur, silicon dioxide (i.e., Silica) curing agents (e.g., TBBS, MBS), dispersion agents, etc. extracted from different parts of the tire, each part of the tire including different concentrations of the foregoing rubber additives.

In one implementation, the set of tires 101 can be selected to include a proportioned mixture (or "ratio") of car tires, truck tires, and other tires defining a feed of tire rubber with a particular (composition) ratio, such as carbon to sulfur content ratio. In this implementation, the ratio of carbon to sulfur content can be optimized to yield carbon black pellets that include particular concentrations and/or ratios of carbon and sulfur. Generally, in rubber applications, sulfur acts as a curing agent that may shorten the "scorch time" (i.e., a time until a rubber material has cured fully) of a rubber material that includes excess sulfur. Therefore, rubber manufacturers may desire to reduce sulfur content within rubber mixtures by limiting the amount of sulfur contained within the recovered carbon black the manufacturers include in rubber mixtures.

In one example, the system 100 can shred the proportioned mixture of tires including five passenger tires and one truck tire into the volume of tire rubber. In this example, the proportioned mixture can be selected to limit sulfur content that enters the pyrolytic reactor 120 in the volume of tire rubber segments 105 to limit the sulfur content of the volume of carbonaceous material 190 and volume of oil 123 output by the pyrolytic reactor 120, as described below. In another example, the system 100 can shred the set of tires including two passenger tires and one truck tire to produce a higher sulfur content recovered carbonaceous material that may be desirable in rubber applications in which a lower scorch time is desirable. In another implementation, the set of tires 101 can be selected from the group including the agricultural tire, the commercial tire, and the passenger tire according to a tire ratio defined by a threshold percentage (e.g., 1%, 5%, 15%, or 20%) of inorganic materials (e.g., zinc oxide, sulfur, silica, and other non-carbonaceous materials) within the volume of carbonaceous material 190. For example, truck (OTR) tires typically contain low silica content (<5% by weight); and passenger car tires can include either low silica content (e.g., 10% by weight) or can include high silica content (e.g, ~15% by weight) to reduce rolling resistance and improve vehicular efficiency and gas mileage. In this example, a set of tires 101 can be selected to limit silica content within the volume of tire rubber segments 105 to less than 5%. Due to the variability in silica content of the feedstock, the pyrolytic reactor 120 is configured to accept and process varying amounts of silica. The set of tires 101 can be selected by any other means and for any other desired effect. Generally, composition of the set of tires 101 directly impacts chemical composition of the recovered carbonaceous material and the performance of the recovered carbonaceous material within rubber and plastics applications as shown in FIG. 8.

Figure 11:
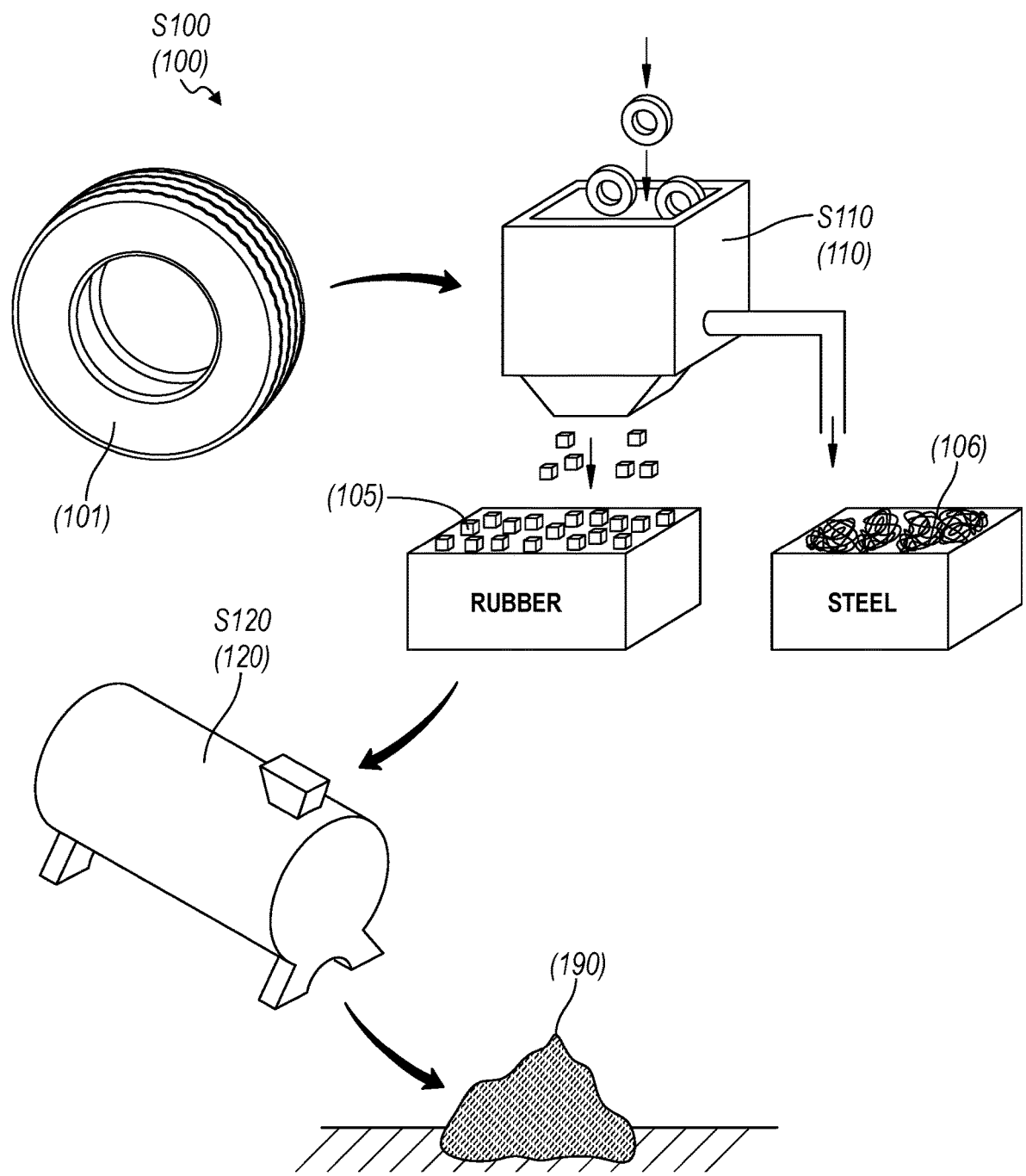
FIG. 11 is a flowchart representation of one implementation of the method.

As shown in FIGS. 5 and 11, the shredding system 110 can include a primary tire shredder 115, which is configured to detach rubber in the feed of waste tires from steel and other materials within the feed of waste tires. Generally, the primary tire shredder 115 can include two rotational blades, each blade adjacent with each other blade in Block S115 of the method. The blades can be positioned such that as a first blade rotates, a cutting surface of the first blade passes a cutting surface of a second blade. Therefore, material situated between the first blade and the second blade can be sheared due to the rotational movement of the first blade and the second blade. As the sets of rotational blades rotate, the blades shear (or cleave) materials into discrete sections (or segments). In Block S110, the system 100 can feed the set of tires 101 into the primary tire shredder 115, which can cleave whole tires into segments. During primary shredding, the primary shredder 115 can separate rubber from steel and textile fiber, thereby removing a portion of the inorganic content of the set of tires 101 from the volume of tire rubber segments 105.

Additionally or alternatively, the primary tire shredder 115 can also cleave the rubber into pieces of a target size configured to break down within pyrolytic reactor 120. For example, the primary tire shredder 115 can cleave the set of tires 101 into granules, strips, and/or chips with a maximum width of one inch, a maximum height of one inch, and a maximum length of one inch. However, the primary tire shredder 115 can shred the volume of tire rubber segments 105 into shreds of any particular volume, maximum dimension, and/or surface area.

Figure 6:
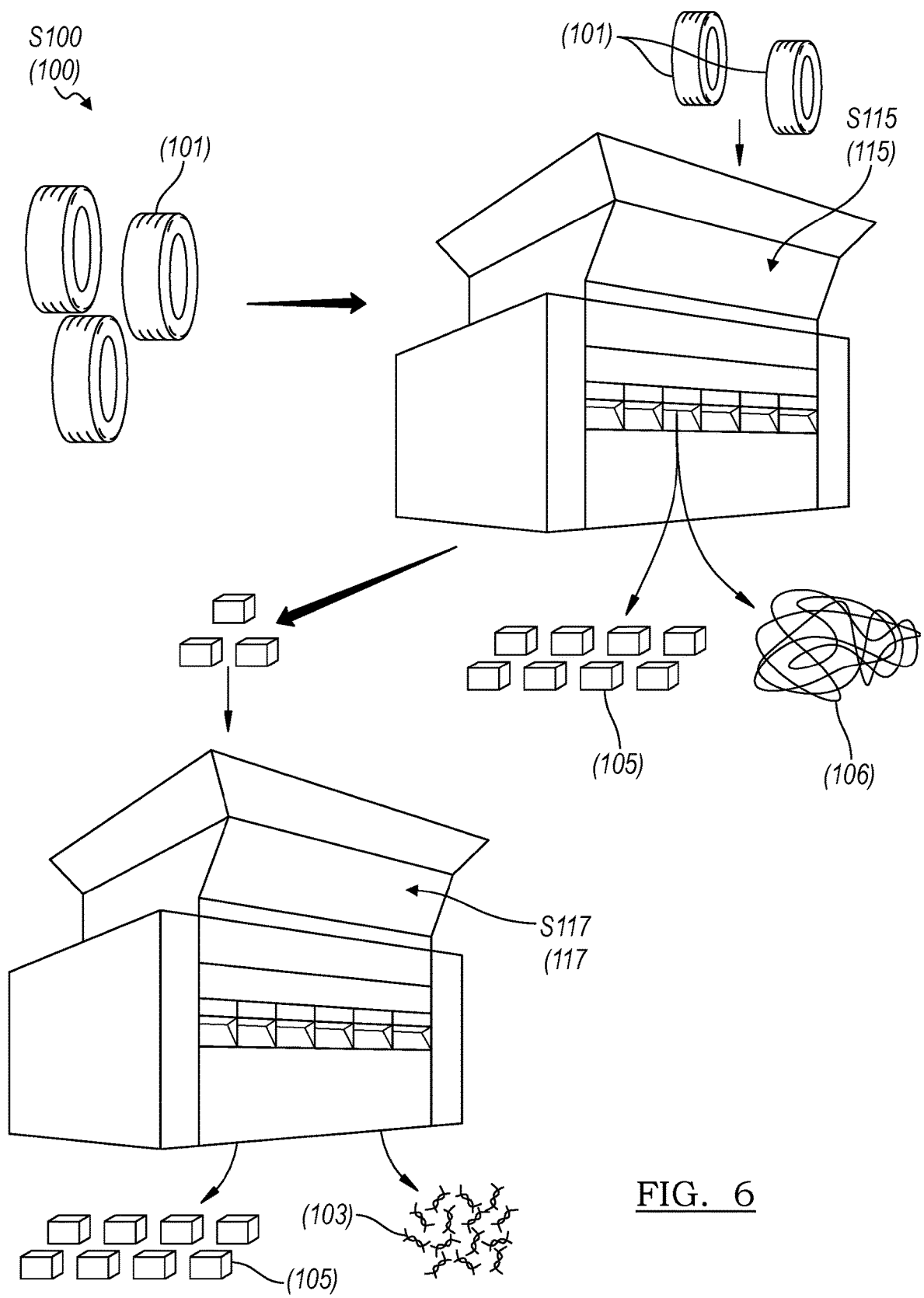
FIG. 6 is a flowchart representation of one implementation of the method.

In one variation shown in FIG. 6, the system 100 can also include a secondary tire shredder 117 configured to shred the tire rubber into a volume of tire rubber segments 105 in Block S117 of the method S100. In this variation, the secondary tire shredder 117 can shred the volume of tire rubber segments shredded by the primary tire shredder into smaller segments of tire rubber of a desired surface area, volume, and/or maximum dimension (e.g., length or width) following separation from other components of the set of tires 101 (e.g., steel wire and textile fiber) in the primary tire shredder 115. The surface area can be selected such that the volume of tire rubber segments 105 pyrolyzes substantially evenly into a volume of carbonaceous material 190, the volume of oil 123, and the volume of gas during thermal decomposition (i.e., pyrolysis). Generally, the secondary tire shredder 117 can include two rotational blades, each blade adjacent with each other blade. The blades can be positioned such that as a first blade rotates, a cutting surface of the first blade passes a cutting surface of a second blade. Therefore, material situated between the first blade and the second blade can be sheared due to the rotational movement of the first blade and the second blade. As the sets of rotational blades rotate, the blades shear (or cleave) materials into discrete sections (or segments). A distance between the blades defines the size of the tire rubber segments shredded by the secondary tire shredder 117. For example, the volume of tire rubber segments 105 can include tire rubber segments one inch wide, two to three inches long, and approximately one-half inch thick. As described below, when oversized tire rubber segments enter the pyrolytic reactor 120, the volume of tire rubber segments 105 can remain partially (or incompletely) pyrolyzed and/or a portion of the volume of tire rubber can be overheated and converted to char. In another example, the secondary tire shredder 117 can cleave the set of tires 101 into granules, strips, and/or chips with a maximum width of one inch, a maximum height of one inch, and a maximum length of one inch.

Alternatively, in one implementation shown in FIG. 6, the primary tire shredder 115 and secondary tire shredder 117 can be coupled and/or integrated such that the primary tire shredder 115 can directly feed the volume of tire rubber segments 105, separated from other components (e.g., steel and nylon), into the secondary tire shredder 117, where the volume of tire rubber segments 105 is shredded into segments of a form factor (e.g., pellets, cubes, or chips) configured to pyrolyze evenly and completely within the pyrolytic reactor 120. In the foregoing implementations, the primary and/or secondary tire shredder 117 can cleave the volume of tire rubber segments 105 into substantially rectangular blocks (e.g, 1 inch by 1 inch by 2 inches), cubes, spheres, pyramids, and/or any other shape. Additionally or alternatively, the secondary tire shredder 117 can also remove textile fiber (i.e., nylon fiber) from the volume of tire rubber segments.

The volume of tire rubber can then be dispersed into a magnetic separator, which can separate magnetic materials (e.g., steel) from non-magnetic materials (e.g., rubber). The magnetic separator can function to limit introduction of steel and other inorganic, magnetic materials to the pyrolytic reactor 120. Magnetic materials extracted from the rubber fed into the magnetic separator can be fed back into the shredding system 110 and/or can be distributed into a steel cleaner, which can further clean the steel and extract remaining rubber residue from the steel. The rubber residue can then be fed into the pyrolytic reactor 120 or back into the shredding system 110 for secondary and/or tertiary shredding.

Alternatively, the system can accept tire chips (i.e. a volume of tire rubber) shredded on a different site by an offsite manufacturer. In this variation, the system may fail to closely control the composition of the volume of tire rubber as the system accepts only the volume of tire rubber selected by the offsite (third-party) manufacturer. In this variation, the volume of tire rubber may include a random or proportioned mixture of various types of tires—the composition of which the system 100 exerts little control. However, the volume of tire rubber may not be optimized to yield a particular composition or performance of the volume of carbonaceous material derived from the volume of tire rubber when implemented in rubber or plastics applications. For example, the offsite manufacturer may select tires according to a specified ratio of commercial to agricultural tires. However, the offsite manufacturer may fail to consider, test, or select other elements critical to the composition of the (resulting) carbonaceous material, such as silica content, carbon black grades included in the tires, etc. Therefore, chemical composition and performance of the volume of carbonaceous material may vary (positively or negatively) according to the composition of the volume of tire rubber selected by the offsite manufacturer. To control chemical composition and performance of the volume of carbonaceous material, the system may preferably shred whole tires into the volume of tire rubber segments in order to verify a feedstock composition that yields a volume of carbonaceous material 190 with a particular chemical composition and/or performance. Generally, a composition of the volume of tire rubber segments can be selected to yield any other composition of carbonaceous material following pyrolysis.

3.2 Pyrolytic Reactor

As shown in FIG. 7, the system 100 can include a pyrolytic reactor 120 configured to thermally depolymerize (or decompose) the volume of tire rubber segments 105 within an inert atmosphere (e.g., in the absence of oxygen) into a set of pyrolytic byproducts including a volume of carbonaceous material 190 including agglomerates of carbonaceous aggregates in Block S120. In particular, the pyrolytic reactor 120 is configured to limit combustion of the volume of tire rubber segments 105 by imposing a vacuum within the pyrolytic reactor 120 and substantially reducing the volume of oxygen present within the pyrolytic reactor 120 as heating elements within the pyrolytic reactor 120 heat the volume of tire rubber segments 105. Generally, the pyrolytic reactor 120 is configured to heat the volume of tire rubber segments 105 (i.e. shredded waste tires) to induce depolymerization of the volume of tire rubber segments 105, thereby yielding a solid carbonaceous residue (i.e., the volume of carbonaceous material 190), pyrolytic oil, and gases (e.g., "syngas" or synthesis gas including hydrogen, carbon monoxide, and other gas-phase fuels).

The volume of tire rubber segments 105 can be fed into the pyrolytic reactor 120 in Block S120 at a particular feed rate (e.g., 2000 pounds per hour) defined by a threshold capacity of the pyrolytic reactor 120 (e.g, a maximum feed rate, volumetric capacity of the pyrolytic reactor 120), a desired production rate (e.g., 600 pounds of carbonaceous material produced per hour or Boo pounds of oil produced per hour), and/or a desired composition of the volume of carbonaceous material 190.

Figure 10:
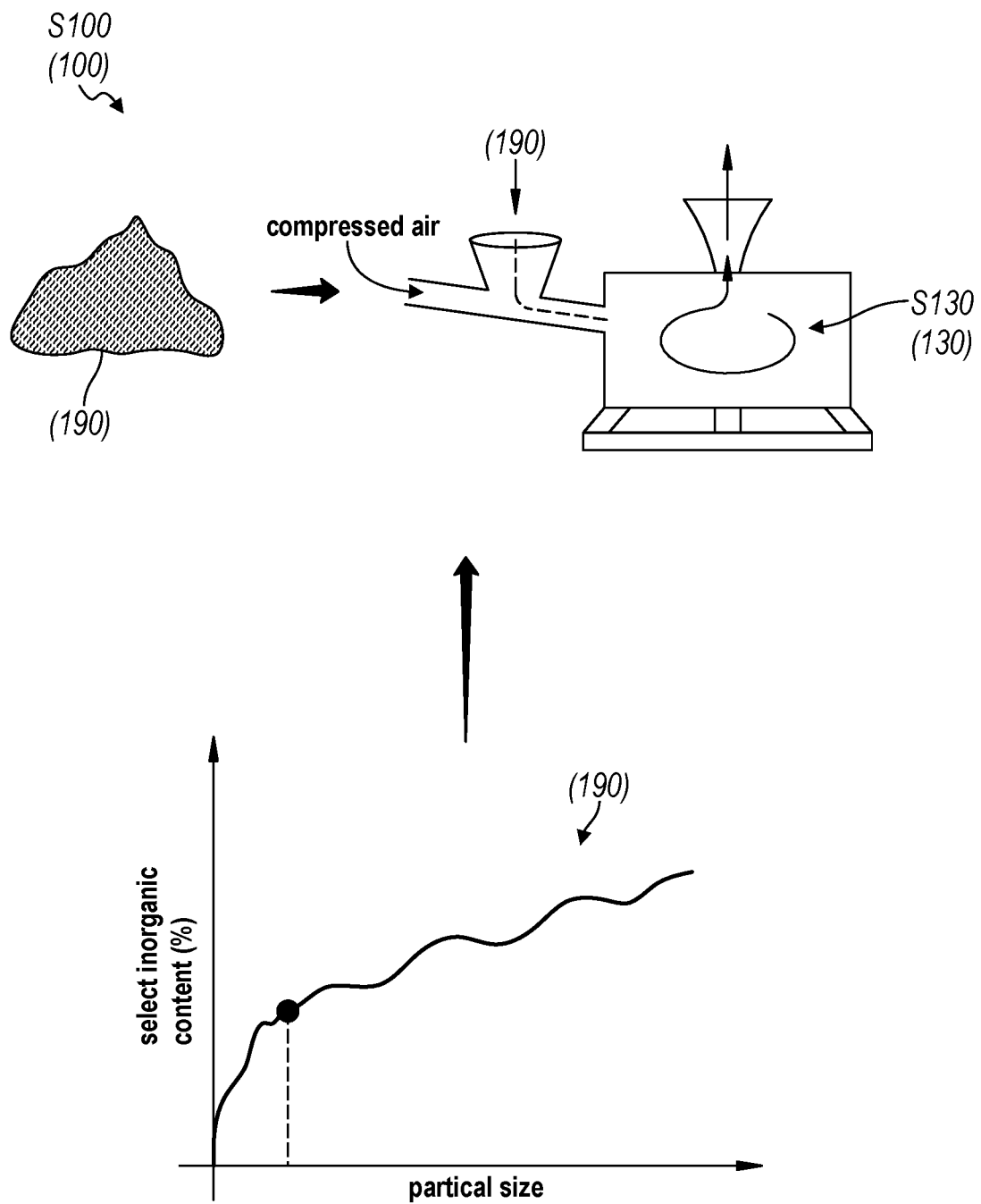
FIG. 10 is a flowchart representation of one implementation of the method.

In one implementation, a conveyor system can feed the volume of tire rubber segments 105 into the pyrolytic reactor 120. During pyrolysis, the volume of tire rubber segments 105 (and the included carbon black grades) can thermally depolymerize into a volume of carbonaceous material 190 including carbonaceous aggregates of carbon particles derived from the set of virgin carbon black grades. The carbonaceous material can define a matrix of organic materials derived from the set of virgin carbon black grades (e.g, N100-N900 grades of carbon black) and inorganic materials derived from the set of rubber additives as shown in FIG. 10.

Figure 7A:
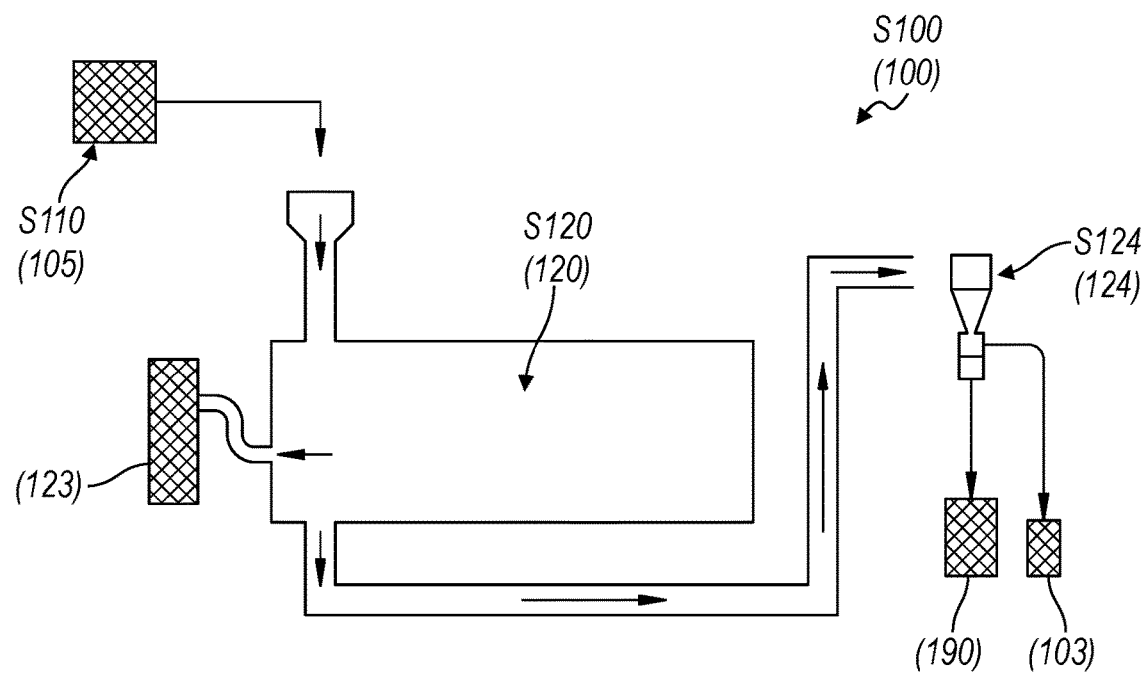
FIGS. 7A and 7B are flowchart representations of one implementation of the method.

As shown in FIG. 7A, in one implementation, the pyrolytic reactor 120 can include a continuous feed reactor configured to continuously pyrolyze the volume of tire rubber segments 105 as the tire rubber translates along a length of the continuous feed reactor. In particular, the continuous feed reactor can include heating elements interspersed along a length of pyrolytic reactor 120 and a retort (i.e., a feed screw) configured to rotationally push the volume of tire rubber segments 105 between an inlet and an outlet of the pyrolytic reactor 120. Additionally, the retort can be configured to scrape or closely track internal walls of the pyrolytic reactor 120 to limit buildup of partially pyrolyzed tire rubber on internal surfaces of the reactor. Buildup of partially pyrolyzed tire rubber can overheat and become "over-pyrolyzed" (i.e., "overcooked") when left static on internal walls of the reactor; when tire rubber is over-pyrolyzed, surface area and/or surface activity of particles of the recovered carbonaceous material may be reduced, limiting reinforcing properties of the recovered carbonaceous material when implemented in rubber applications.

Figure 7B:
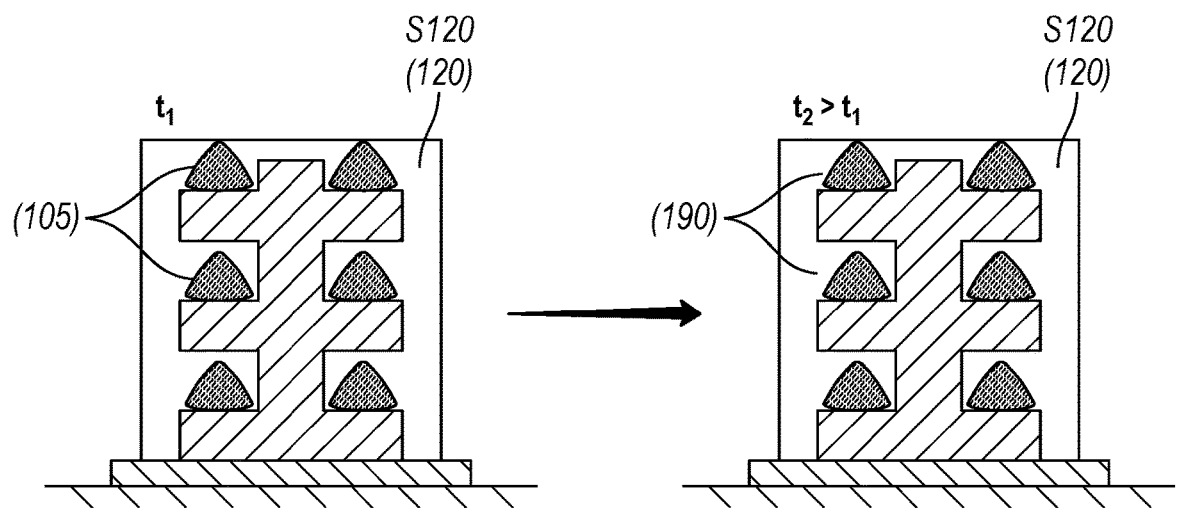

Additionally or alternatively, the pyrolytic reactor 120 can include a batch pyrolytic reactor 120 configured to accept the volume of tire rubber segments 105 and pyrolyze the volume of tire rubber segments 105 over a time window at a stationary location as shown in FIG. 7B.

The pyrolytic reactor 120 can also output a volume of oil 123 and a volume of gas. In Block S122, the volume of oil 123 and the volume of gas can include concentrations of sulfur and other materials extracted from the tire rubber during pyrolysis. In one implementation, the volume of gas can include residual carbonaceous material that can be carried over into a gas extraction system that can be coupled to the pyrolytic reactor 120. Due to high velocities of the volume of gas upon exiting the pyrolytic reactor 120, some carbonaceous material can be blown or otherwise carried into the gas extraction system. To prevent clogging of the gas extraction system due to build-up of carbonaceous material within the gas extraction system, the gas extraction system can include a filter situated between the pyrolytic reactor 120 and the gas extraction system. The filter can be configured to capture residual carbonaceous material before the carbonaceous material enters a main body of the gas extraction system downstream from the filter. The filter can be changed and/or cleaned at intervals to prevent clogging of the filter. If the filter were to clog, a clog would limit the volume of gas from escaping the pyrolytic reactor 120, causing a buildup of combustible gas (and pressure) within the pyrolytic reactor 120. Similarly, the volume of oil 123 can include residual carbonaceous material be carried over into an oil extraction system that can be coupled to the pyrolytic reactor 120. The oil extraction system can include a filter configured to capture carbonaceous material prior to entry into a downstream portion of the oil extraction system, which can include an oil condensation system with spray nozzles.

In one implementation, the pyrolytic reactor 120 can output the volume of carbonaceous material 190 that includes (agglomerated carbon) particles of a particular particle size distribution in Block S120. For example, the particle size distribution can include particles in which the 99th percentile of particle size (i.e., D99) is less than 30 micrometers and 50th percentile of particle size (i.e., D50) is less than 6 micrometers. For example, the particle size distribution can include particles in which the 99th percentile of particle size (i.e., D99) is less than 50 micrometers and 50th percentile of particle size (i.e., D50) is less than 2 micrometers and/or an average agglomerate size of 1-2 micrometers. In another example, the pyrolytic reactor 120 converts waste tires into the volume of carbonaceous material 190 including agglomerates between 200 micrometers to 400 micrometers comprising carbon particles between 500 nanometers and 2 micrometers. Additionally or alternatively, the pyrolytic reactor 120 can output carbon particles with nitrogen surface area between 60 and 70 $m^2/g$ and a particle surface area between 65 and 70 $m^2/g$. As described above, nitrogen surface area and particle surface area of carbon particles within a volume of carbonaceous material 190 are, generally, predictive of performance of the volume of carbonaceous material 190 in rubber applications. Generally, the pyrolytic reactor 120 can be configured to operate at an operating temperature (>500 degrees Fahrenheit) and operating pressure that yields a particular particle surface chemistry and depolymerization percentage and outputs carbonaceous material of a composition directly proportional to the composition of the volume of tire rubber segments (i.e., the feedstock).

The pyrolytic reactor 120 can also include a magnetic separator 124 as shown in FIG. 7A. The magnetic separator 124 can be configured to magnetically extract remaining steel and other magnetic materials from the volume of carbonaceous material following pyrolysis in Block S124 of the method S100.

Additionally or alternatively, a conveyor or other transport system (e.g., a pneumatic conveyor or human operator) can then transport the volume of carbonaceous material 190 from the pyrolytic reactor 120 to a feed hopper, which can deliver the volume of carbonaceous material 190 to a finishing system configured to convert the (powder) volume of carbonaceous material 190 into pelletized carbon black, as described below.

Generally, particle sizes and composition of the volume of carbonaceous material 190 are proportional to the particle size and composition of the volume of tire rubber from which the volume of carbonaceous material was derived. However, due to the varying carbon particle sizes of the volume of tire rubber, the system may mill, pulverize, and/or otherwise reduce particles within the volume of carbonaceous material to create a substantially uniform distribution of particles that yield consistent performance when implemented into rubber and plastics applications as described below.

3.3 Mill

Figure 3:
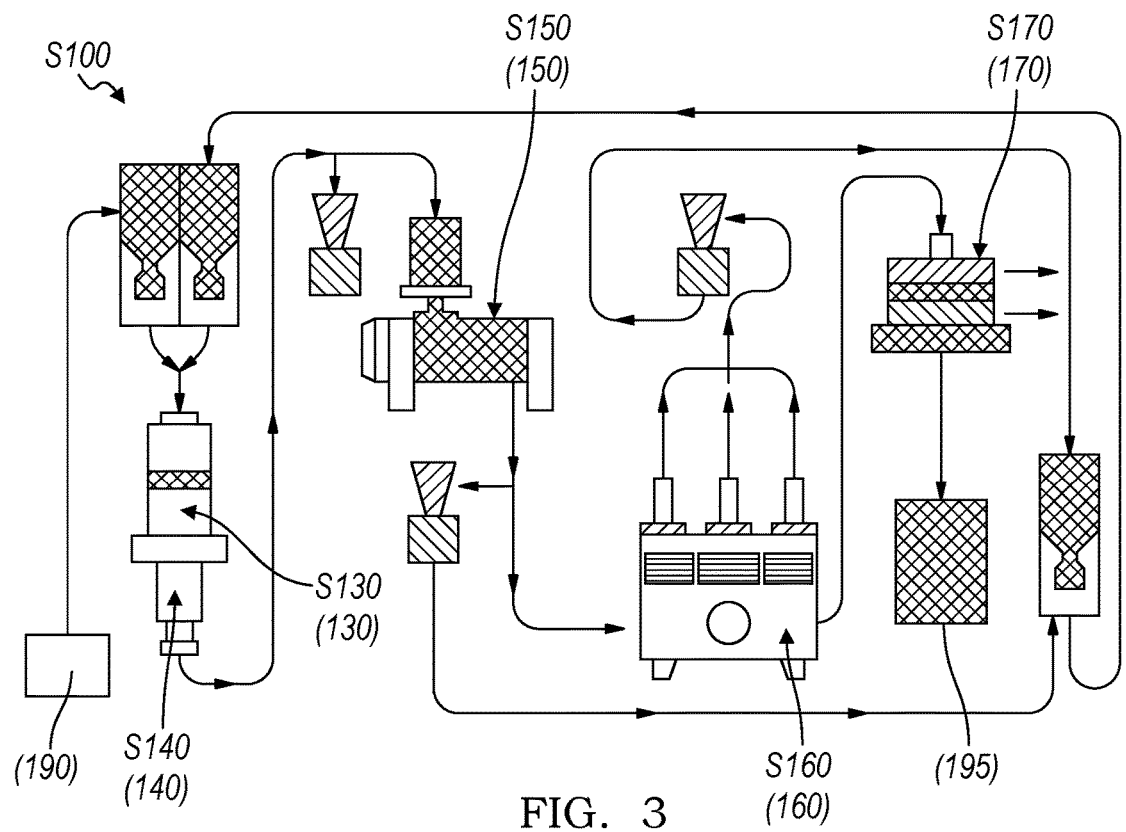
FIG. 3 is a flowchart representation of one implementation of the method.

As shown in FIGS. 3 and 4, the system 100 can include a finishing system that includes a mill 130 or other grinding or comminuting system configured to comminute the volume of carbonaceous material 190 to reduce a diameter of an agglomerate within the volume of carbonaceous material 190 to less than a maximum agglomerate diameter in Block S130. Generally, the mill 130 can be configured to pulverize, grind, and/or comminute the volume of carbonaceous material 190 into smaller and/or a standardized size distribution of agglomerates of carbon black, which enables consistent performance and distribution The mill 130 can include a hammermill, a bead mill, a steam mill, and/or any other grinding, pulverizing, or milling machine. For example, the system 100 can include a hammermill, which can crush the volume of carbonaceous material 190 into smaller agglomerates with hammer pins, thereby causing destruction of a subset of bonds that make up agglomerates within the volume of carbonaceous material 190 and causing transformation of the structure and shape of the agglomerates. Alternatively, the system 100 can include a steam jet mill configured grind the volume of carbonaceous material 190 into smaller agglomerates while activating surface chemistry of the agglomerates with steam, which can facilitate bonding between aggregates of carbon black and agglomerates of carbon black and/or other materials (e.g., rubber polymers). Generally, the mill 130 can grind the volume of carbonaceous material 190 into a volume of carbonaceous material 190, wherein each agglomerate is of an average diameter between 500 nanometers and two micrometers. However, the system 100 can include any other type of mill that can grind the volume of carbonaceous material 190 into any other size agglomerates and/or distribution of sizes.

As described above, the system 100 can include a feed hopper configured to accept the volume of carbonaceous material 190 and deliver the volume of carbonaceous material 190 at a particular feed rate to a mill 130 for pulverization. In one implementation, the feed hopper can include a pyramidal chute or valve configured to hold the carbonaceous material and deposit the carbonaceous material into a magnetic separator 124 configured to extract magnetic (e.g., steel or other magnetic metal) residue remaining within the volume of carbonaceous material 190 following pyrolysis as shown in FIG. 7A.

Generally, the volume of carbonaceous material 190 resulting from pyrolysis (Block S120 includes carbonaceous agglomerates between 500 nanometers and 10 micrometers. These carbonaceous agglomerates exhibit limited dispersion and reinforcing properties compared to carbonaceous agglomerates of virgin carbon black due to the size, surface chemistry, non-uniform composition, particle size distribution, etc. of the reclaimed carbonaceous agglomerates. Therefore, the system 100 can function to break up these carbonaceous agglomerates into smaller agglomerated particles (between 500 nanometers and 2 micrometers) and pelletize the smaller agglomerated particles to form carbon black pellets (i.e., a set of pellets 195) as shown in FIG. 4. The system 100 can mill the carbonaceous material to a range of agglomerate sizes (i.e., a particle size distribution) to limit oversized agglomerates. Additionally, the system 100 can be configured to limit undersized agglomerates. In one implementation, the particle size distribution can be defined by a maximum (target) particle size that can correspond to a largest known particle or agglomerate size of the virgin carbon black grades that entered the pyrolytic reactor 120 (e.g., ~1 micrometer particle size for N900 series virgin carbon black), as shown in FIG. 12. Additionally or alternatively, the particle size distribution can be defined by the maximum (target) particle size that can correspond to a largest known particle or agglomerate size of inorganic materials in the volume of tire rubber, such as silica and/or sulfur. Furthermore, the maximum particle size can correspond to (or be proportional to) an industry standard for maximum particle size (e.g., 5 micrometers) of carbon black and/or a particle size minimum defined by the mill's specifications.

Additionally or alternatively, the particle size distribution can define a minimum particle size that can correspond to a smallest known particle or agglomerate size of the virgin carbon black grades that entered the pyrolytic reactor 120 in the volume of tire rubber (e.g., ~10 nanometers particle size for Moo series virgin carbon black). The minimum particle size can additionally or alternatively correspond to a smallest known particle or agglomerate size of inorganic materials in the volume of tire rubber, such as sulfur, silica, and/or calcium. Furthermore, the maximum particle size can correspond to (or be proportional to) an industry standard for minimum particle size of carbon black (e.g., 500 nanometers) or a largest known particle size that can become airborne or respirable by a human when agitated (e.g., 10 nanometers). In one example implementation, a hammermill can comminute the volume of carbonaceous material 190 to a distribution of agglomerate sizes less than the maximum particle size (e.g., 5 micrometers) and larger than the minimum particle size (e.g, 750 nanometers).

In one variation, the mill 130 can also include a mixing chamber in which the volume of carbonaceous material 190 can mix with pressurized air of a particular humidity level (e.g., dry). In this variation, pressurized air can force agglomerates into the mill 130 for pulverization as shown in FIG. 10.

3.4 Mill Classifier

As shown in FIG. 3, the system 100 can include a mill classifier 140 configured to remove from the volume of carbonaceous material 190 agglomerates larger than the maximum agglomerate diameter in Block S140. Additionally or alternatively, the mill classifier 140 can be configured to remove agglomerates smaller than a minimum agglomerate diameter. Generally, after milling, the mill 130 can deposit the volume of carbonaceous material 190 into a mill classifier 140 configured to separate oversized agglomerates (i.e., agglomerates larger than a predetermined acceptable diameter or outside the particle size distribution) from the volume of aggregate particles. For example, the mill classifier 140 can separate agglomerates larger than 10 micrometers in diameter and recycle these agglomerates through the mill 130 for further grinding.

Additionally or alternatively, the mill classifier 140 can separate undersized agglomerates (i.e., particles smaller than the predetermined acceptable diameter or outside the range of acceptable particle dimensions) from the volume of aggregate particles. Therefore, the mill classifier 140 inhibits passage of oversized and/or undersized agglomerates into subsequent sections of the system 100, where the oversized and/or undersized aggregate will be pelletized, dried, and classified once again.

In one implementation shown in FIG. 3, the system 100 can feed agglomerates of recovered carbon larger than the maximum agglomerate size back into the mill 130 (e.g., a hammer mill); comminute the agglomerates larger than the maximum agglomerate size over a third time interval to reduce agglomerate size of agglomerates larger than the maximum agglomerate size to an agglomerate size less the maximum agglomerate size; and mix the powder into the volume of carbonaceous material 190. In this implementation, the system 100 can recycle over and/or undersized agglomerates back into the mill 130. This implementation functions to reduce loss of recovered carbonaceous material due to out-of-spec size of agglomerates following a first (or subsequent) pass through the mill 130 and increase overall throughput of the system 100.

3.4 Mixer

As shown in FIGS. 3 and 4, the system 100 can also include a mixer 150 configured to mix the volume of carbonaceous material 190 with a binding agent over a first interval, the mixer 150 inducing formation of a set of pellets 195 of a range of pellet diameters in Block S150. Generally, following classification, a conveyor system (e.g, a pneumatic conveyor) can transport the volume of carbonaceous material 190 to a feed hopper for distribution of the volume of carbonaceous material 190 into a pelletizing system 199, which can include the mixer 150. In one implementation, once deposited into the mixer 150, the mixer 150 can implement a process of wet pelletization of the volume of aggregate particles. In this implementation, spray (e.g., atomizing) nozzles dispersed throughout the mixer 150 can spray the volume of carbonaceous material 190 with a binding agent, such as water, toluene, zinc oxide, lignosulfonate, mineral oil, and/or any other binding agent in Block S152. For example, nozzles within the mixer 150 can spray the volume of carbonaceous material 190 with a volume of water (e.g., 30-50% of the total mass of carbonaceous material within the mixer 150). Alternatively, nozzles can spray the volume of carbonaceous material 190 with water and/or other agents prior to deposition into the mixer 150.

In one variation, the mixer 150 can spray or otherwise mix a binding agent—such as toluene, water, calcium lignin sulfonate, starch, molasses, and/or any other binding agent—into the volume of carbonaceous material 190 to facilitate agglomeration of the carbon agglomerates into discrete pellets and modify cross-linking and bonding between the carbonaceous material and rubber additives (e.g., polymers, curing agents, and/or dispersion agents). As described below, the binding agent mixed into the volume of carbonaceous material 190 of carbon black can affect material properties of rubber and plastic materials compounded from the set of pellets 195 and dispersion (and mixing) behavior of the set of pellets 195 when mixed with other materials and components. Generally, reclaimed carbon black pellets include binding agents (e.g., ligand) introduced during pelletization to assist in binding and cross-linking with particles of other materials and assist in the agglomeration of the carbonaceous material into discrete (agglomerated) pellets. However, in the absence of a binding agent, carbonaceous ash present at on external surfaces of the set of pellets 195 can function as a binding agent.

In the foregoing implementation, the volume of water and the volume of carbonaceous material 190 can be agitated, rotated, and/or mixed to induce agglomeration (i.e., clumping or "balling") of carbon agglomerates into discrete carbon black pellets (the set of pellets 195). For example, the mixer 150 can include a pin mixer configured to agitate and mix and form homogenous pellets.

Additionally or alternatively, once deposited into the mixer 150, the mixer 150 can implement a process of dry pelletization of the volume of carbonaceous material 190 in which dry agglomerates of carbon black are compacted (or compressed) by rolling the agglomerates into pellets. However, the mixer 150 can form or mold pellets of carbon black by any other means according to any other suitable method.

3.5 Dryer

Figure 9A:
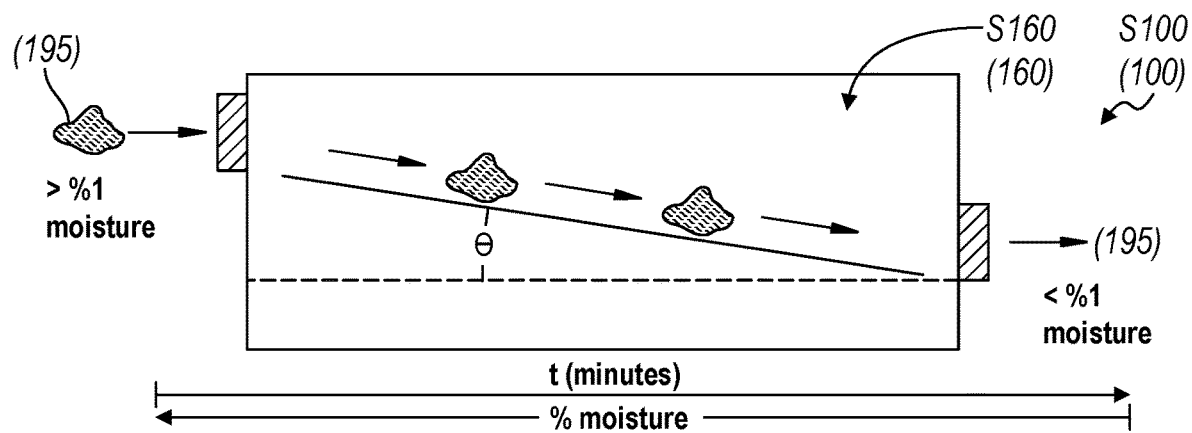
FIGS. 9A, 9B, and 9C are schematic representations of one implementation of the method.

As shown in FIG. 9A, the system 100 also includes a dryer 160 configured to dry the set of pellets 195 within a dryer 160 to a particular moisture content over a second interval defined by a rate the set of pellets 195 translates across a length of the dryer 160 and by an operating temperature of the dryer 160 in Block S160. Generally, following pelletization, a conveyor (e.g., a pneumatic conveyor) can transport the set of pellets 195 to a dryer 160 to reduce the moisture content within the set of pellets 195. Additionally or alternatively, the dryer 160 can dry the set of pellets 195 to a particular pellet hardness.

In one implementation, the dryer 160 can heat the set of pellets 195 to evaporate water and other liquid-phase fluids within the set of pellets 195 and, thereby, reduce moisture content (e.g., by 99% to less than 1% moisture remaining) in the set of pellets. In this implementation, the dryer 160 can drive combustion air over the set of pellets 195 to heat the carbon pellets and induce evaporation. Alternatively, the dryer 160 can include heating elements, which can directly or indirectly heat a chamber containing the set of pellets 195. In this implementation, the dryer 160 can drive filtered (dry) air over the set of pellets 195. In one implementation, the combustion air can include the volume of gas extracted from the pyrolytic reactor 120 during pyrolysis. Generally, gases introduced to the system 100 during drying can affect surface chemistry of the set of pellets 195, which may affect dispersion and reinforcing properties of the carbon black agglomerates when mixed with other materials.

The dryer 160 can also include a centrifuge, retort screw, or other mixing chamber configured to mix the pellets during the drying process to facilitate even drying throughout the set of pellets 195 within the dryer 160. However, the dryer 160 can dry the set of pellets 195 by any other suitable means.

Figure 9B:
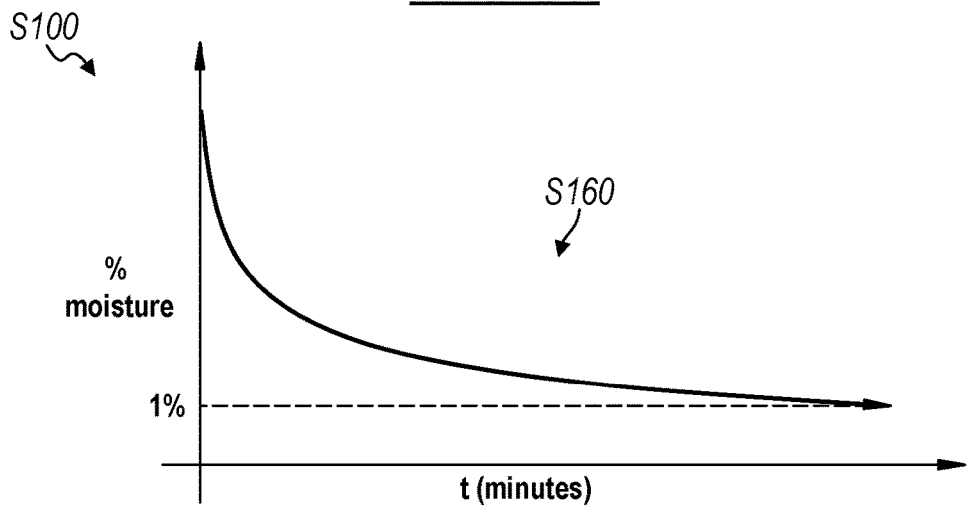
Figure 9C:
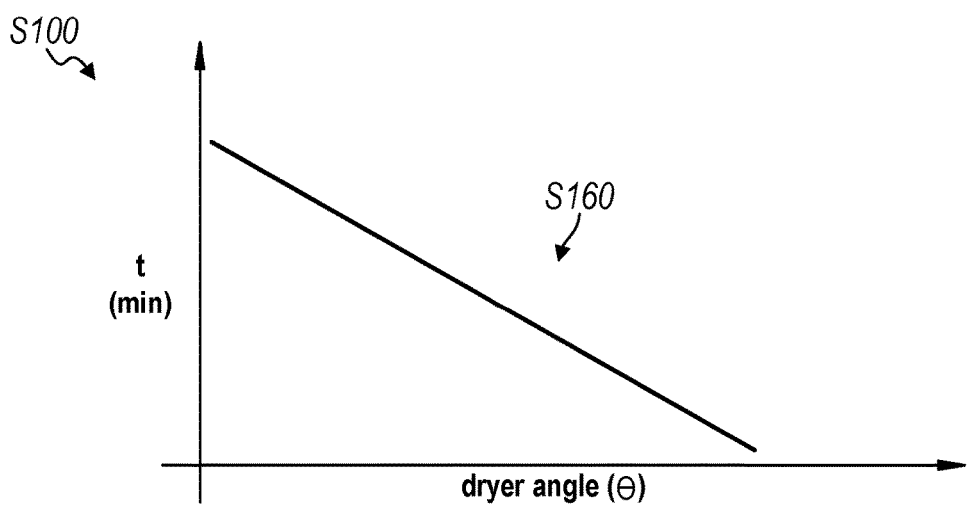

In one variation shown in FIG. 9A, the dryer 160 can include heating element interspersed along a length of the dryer 160. A bed (e.g., a conveyor belt and/or a fluidized bed) can transport the set of pellets 195 along the length of the dryer 160, the heating elements increasing the temperature of the set of pellets 195 to induce evaporation of moisture out of the set of pellets 195. Alternatively, the dryer 160 can define an angle between a plane transecting a length of the dryer 160 and a horizontal plane (i.e., defined by the floor), as shown in FIG. 9C. In this implementation, the dryer 160 can manipulate the angle to be less acute to increase a speed at which the set of pellets 195 traverses the length of the dryer 160 and more acute to decrease the speed at which the set of pellets 195 traverse the length of the dryer 160. Slower speeds correlate to a longer drying interval and, therefore, a lower moisture content. Higher speeds correlate to a shorter drying interval and, therefore, a higher moisture content as shown in FIG. 9B.

Generally, the dryer 160 can dry (e.g., induce evaporation of moisture off) the set of pellets 195 to a particular moisture content (e.g., less than two percent moisture content). However, due to variable ambient conditions, the dryer 160 can iteratively dry the set of pellets 195 until the set of pellets 195 include a target moisture content. For example, the dryer 160 can dry the set of pellets 195 to the particular moisture content less than two percent moisture content. Additionally, the system 100 can separate a set of high moisture content pellets exceeding the particular moisture content from the set of pellets 195 through size and/or hardness classification. The system 100 can then transport the high moisture content pellets back to the mill 130, where the mill 130 can mill the set of high moisture content pellets into a powder. The system 100 can then mix the powder with the volume of carbonaceous material 190 to repelletize the powder and the volume of carbonaceous material 190.

In one variation, the system 100 can repelletize and/or dry a set of pellets 195 following a prolonged storage period (e.g., one month) to reduce moisture content that can be absorbed from ambient over long storage periods due to exposure to ambient humidity, inherent particle porosity of recovered carbonaceous material, and/or calcium content of the pellets. In this implementation, the dryer can accept the set of pellets 195 and dry the set of pellets 195 to the particular moisture content a second time. Alternatively, the set of pellets 195 can be repelletized. In this implementation, the system 100 can introduce the set of pellets 195 back into the mill 130, where the mill 130 can comminute the pellets into a powder. The powder can be mixed with the volume of carbonaceous material 190 and then mixed with a binding agent within the mixer 150 to form a new set of pellets 195. The new set of pellets 195 can then be dried again to a particular moisture content.

3.6 Pellet Classifier

Additionally or alternatively, the system 100 can include a (second) pellet classifier 170 configured to remove from the set of pellets 195 a subset of pellets larger than a maximum pellet size. A conveyor can transport the set of pellets 195 to a pellet classifier 170 (e.g., a grate or rotary classifying wheel) configured to separate oversized and undersized pellets from the set of pellets 195. The pellet classifier 170 can identify, sort, and extract from the set of pellets a subset of pellets that are oversized (i.e., larger than a predefined range of acceptable pellet sizes) and/or undersized (i.e., smaller than the predefined range of acceptable pellet sizes). The pellet classifier 170 can then return the oversized and undersized pellets to a feed hopper of the mill 130, where the oversized and undersized pellets will be reground and mixed in with the volume of carbonaceous material 190 to be pelletized, dried, and classified again. Therefore, the pellet classifier 170 can function to isolate approximately uniform size (or shape or diameter) pellets that facility operators can then pack and ship to customers for application.

In one implementation, the system 100 can remove from the set of pellets 195 a subset of pellets 195 larger than the maximum pellet size. In this implementation, the maximum pellet size can directly proportional to a maximum pellet hardness, defined by a desired dispersion coefficient of the set of pellets 195 when mixed with a volume of rubber polymers and/or plastic polymers.

Additionally or alternatively, the pellet classifier 170 can remove a subset of pellets smaller than the minimum pellet size. The minimum pellet size can be larger than a maximum particle size (e.g., 1 micrometer) of the volume of carbonaceous material 190 and proportional to a particle size of a largest grade of carbon black in the set of a virgin carbon black grades within the volume of tire rubber segments 105.

Additionally or alternatively, the system 100 can also include dust collectors 180 dispersed throughout the system 100 and configured to extract carbon black dust (i.e., fine powder or small particles) from air within the system 100 and prevent clogs due to accumulation of carbon black dust within the system 100. The dust collectors 180 can function to reduce cleaning time for up-keep and prolonged operation of the system 100.

5. Products

The system 100 can output reclaimed carbon black pellets, which can be reground, mixed, and/or otherwise implemented in industrials applications, such as rubber compounding, plastic compounding, plastic pigmentation. The set of pellets 195 include carbonaceous agglomerates between one and ten micrometers. These carbonaceous agglomerates can be mixed with other materials to replace virgin carbon black agglomerates, such as N500, N700, and N900 grade carbon black. Generally, the set of pellets includes a composition of carbonaceous material proportional (and/or identical) to the volume of tire rubber segments that were pyrolyzed in the pyrolytic reactor 120. In particular, the set of tires selected to be transformed into the volume of carbonaceous material exhibit a direct effect on the (output) carbonaceous products yielded by the system.

Additionally, the system 100 can produce carbonaceous agglomerates exhibiting a particular surface chemistry or surface area conducive for mixing and dispersion resulting from the composition of the volume of tire rubber segments extracted from the set of tires in Block Silo. For example, the carbonaceous agglomerates can exhibit high concentrations of nitrogen at external surfaces of the carbonaceous agglomerates. Therefore, the carbonaceous agglomerates can exhibit a high nitrogen surface area indicating a particular binding affinity between the carbonaceous agglomerates and other materials when used in rubber compounding.

6. Post-Processing

Generally, a tire includes natural and/or synthetic rubber, anti-degradant chemicals, curatives, reinforcing fillers (e.g., carbon black and silica), fiberglass, steel wire, etc. As shown in FIGS. 2, 5, 6, and 8, tires can be recycled by separating steel and various fibers from rubber components of the tire and thermally decomposing the rubber components through vacuum tire pyrolysis. Products of tire pyrolysis of rubber extracted from waste tires include aromatic-rich hydrocarbon oil, reclaimed (or pyrolytic) carbon black, gas, and steel wire. The reclaimed carbon black differs in morphology and chemical composition from the virgin carbon black—produced by pyrolyzing petroleum. Generally, reclaimed carbon black includes a mixture of hydrocarbons generated during thermal decomposition of the tire rubber and other contaminants derived from other materials added to tires (e.g., silica, zinc oxide, fiberglass). These contaminants can form ash and grit. Generally, ash includes the non-aqueous, non-gaseous material remaining after incomplete combustion or thermal decomposition of a material—in this case, incomplete decomposition of rubber recycled from waste tires. Ash can include inorganic materials, such as zinc oxide, sulfur, calcium carbonate, metals, etc.

One variation of the method S100 can be implemented by the system 100 to reduce effects of grit content in compounds that include mixtures of reclaimed carbon black (hereinafter "volume of carbonaceous material 190"), ash, and grit produced by pyrolyzing rubber extracted from recycled—or waste—tires. Since grit and ash particles are generally larger and heavier than the volume of carbonaceous material 190 aggregates, grit and ash can cause surface imperfections in rubber and/or plastic produced from the volume of carbonaceous material 190, ash, and grit mixture. For example, in rubber compounds developed for extrusion, grit and other contaminants can induce surface imperfections such as pits, bumps, and divots, that may compromise or diminish material properties of the extruded rubber (e.g., yield strength, tensile strength, Young's modulus).

Figure 14:
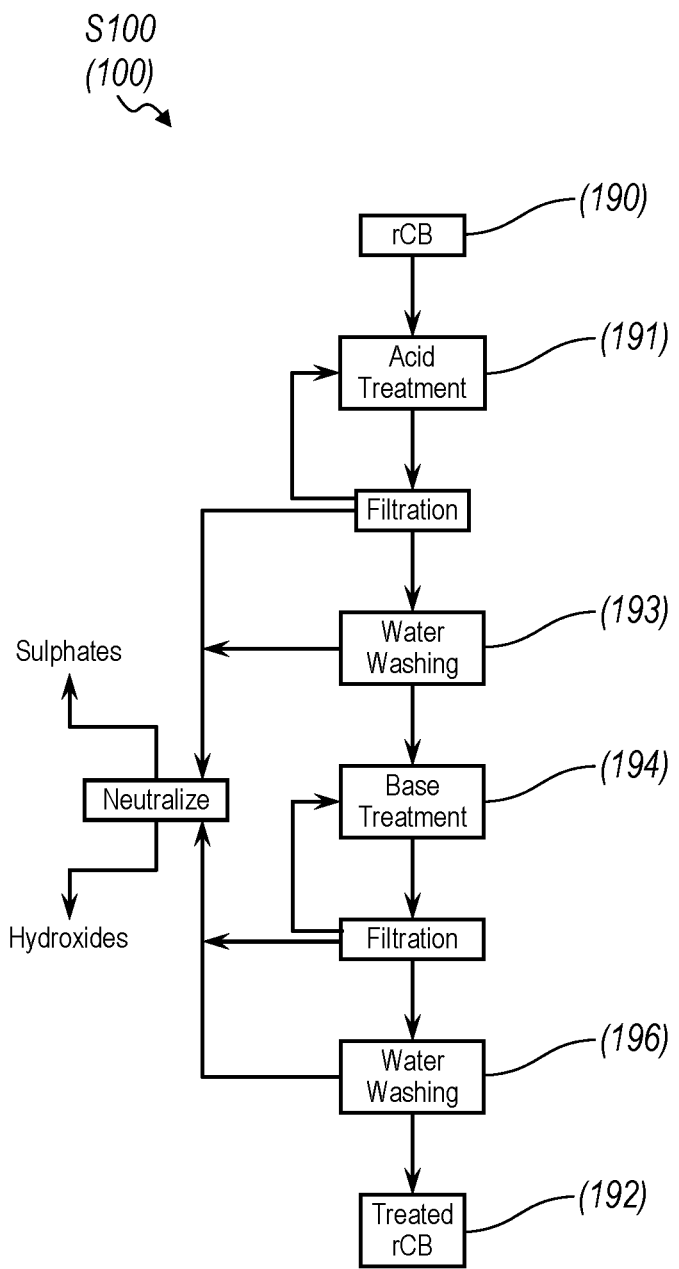
FIG. 14 is a flowchart representation of one implementation of the method.

As shown in FIGS. 13 and 14, one variation of the method S100 includes reducing effects of grit and other contaminants in compounds that include mixtures of the volume of carbonaceous material 190, ash, and grit includes reducing introduction of inorganic materials into the compound by extracting or otherwise removing a portion of the inorganic materials from the mixture prior to compounding. Generally, in method S100, a system 100 can wash the mixture of the volume of carbonaceous material 190, ash, and grit with diluted acid (e.g., sulfuric acid or hydrochloric acid) in Block S191 of the method S100 to demineralize the mixture and, therefore, remove inorganic material from the mixture to form treated carbonaceous material 192 with lower ash content. Then the system 100 can soak the treated carbonaceous material 192 in a neutralizing wash, such as in water, in Block S193 of the method S100. Additionally or alternatively, the system 100 can wash the mixture of the volume of carbonaceous material 190, ash, and grit with a base (e.g., sodium hydroxide) to remove remaining inorganics from the mixture in Block S194 of the method Sim, and form treated carbonaceous material 192 with lower ash content. The acid and/or base functions to demineralize the mixture, thereby reducing the ash and grit content of the mixture. Then the system 100 can soak the treated carbonaceous material 192 in a neutralizing wash, such as in water, in Block S196 of the method S100.

One variation of the method Sim, for reducing effects of grit and other contaminants in compounds that include mixtures the volume of carbonaceous material 190, ash, and grit includes reducing size of grit and ash particles. As shown in FIG. 9, the variation includes pulverizing and/or milling the mixture of the volume of carbonaceous material 190, ash, and grit in a jet and/or steam mill to reduce overall particle size of the mixture and create a more uniform distribution of particle sizes within the mixture, thereby limiting surface aberrations due to disparities in particle sizes. Additionally or alternatively, the system 100 can include an air classifying mill (hereinafter ACM), which functions to separate large, heavy particles (e.g., grit and ash), thereby limiting introduction of oversized particles within the mixtures applied in rubber and plastic compounding and limiting surface aberrations due to disparities in particle sizes.

Another variation of the method S100 for reducing effects of grit and other contaminants in compounds that include mixtures the volume of carbonaceous material 190, ash, and grit includes altering feedstock and pyrolysis operating parameters to prevent burning of the tire-derived rubber, which fosters production of ash and grit during thermal decomposition of waste tire-derived rubber. Generally, by maintaining the operating temperature of the pyrolytic reactor 120 below a threshold temperature and increasing residence time of material within the pyrolytic reactor 120, the system 100 limits charring (i.e., ash production) of material.

Additionally, the system 100 can receive a volume of tire rubber (i.e., feedstock) derived from a combination of various types of tires (e.g., car, truck, agricultural tires); the system 100 can select the feedstock to limit production of grit and other contaminants during pyrolysis. Each type of tire includes different materials and different percentages of materials. Therefore, a mixture of the volume of carbonaceous material 190, grit, and ash derived from pyrolyzed rubber extracted from a car tire differs in composition from a mixture of the volume of carbonaceous material 190, grit, and ash derived from pyrolyzed rubber extracted from a truck tire. For example, the mixture of the volume of carbonaceous material 190, grit, and ash derived from pyrolyzed rubber extracted from a car tire may have lower ash content and less inorganic contaminants (e.g., sulfur or silica) than the mixture the volume of carbonaceous material 190, grit, and ash derived from pyrolyzed rubber extracted from a truck tire. The system 100 can take in a volume of tire rubber (i.e., feedstock) derived from a particular combination of types of tires to yield a particular mixture of the volume of carbonaceous material 190, grit, and ash and thereby limit contaminants that can yield surface imperfections in rubber and/or plastic compounds. For example, the feedstock can include rubber with approximately 60-85% of the rubber derived from car tires and approximately 15-40% of the rubber derived from truck tires to limit pitting in a rubber compound applied in a rubber extrusion application.

However, the system 100 can reduce effects of grit and other contaminants in compounds that include mixtures the volume of carbonaceous material 190, ash, and grit by any other means or methods.

The system 100 described herein can also include any alternative or additional components or machinery configured to process reclaimed carbon black agglomerates to a particular size and/or shape, said carbon black agglomerates exhibiting particular material properties, such as binding affinity, dispersion efficacy, etc.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, native application, frame, iframe, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer-readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made in the foregoing embodiments of the invention without departing from the scope of this invention as defined in the following claims.

We claim:

1. A method for converting tires into pelletized, recovered carbon black comprising:

selecting a set of tires comprising car tires and truck tires such that the set of tires comprises approximately 60-85% by weight tire rubber from car tires, and approximately 15-40% by weight tire rubber from truck tires;

shredding the set of tires into a volume of tire rubber segments;

in a pyrolytic reactor, thermally depolymerizing the volume of tire rubber segments, within an inert atmosphere, into a set of pyrolytic byproducts comprising a volume of carbonaceous material;

comminuting the volume of carbonaceous material to reduce a diameter of an agglomerate within the volume of carbonaceous material;

removing from the volume of carbonaceous material agglomerates larger than a maximum agglomerate diameter and agglomerates smaller than a minimum agglomerate diameter;

within a mixer, mixing the volume of carbonaceous material with a binding agent over a first interval, the mixer inducing formation of a set of pellets of a range of pellet diameters;

removing a first subset of pellets from the set of pellets, the first subset of pellets larger than a maximum pellet size; and wherein said selecting step comprises selecting the set of tires to achieve a percentage of an inorganic material within the volume of carbonaceous material, the percentage of an inorganic material being selected from the group consisting of (i) less than twenty percent of sulfur by weight, (ii) less than five percent of silica by weight, and (iii) less than twenty percent of sulfur by weight and less than five percent of silica by weight.

2. The method of claim 1, wherein shredding the set of tires comprises:

within a primary tire shredder, separating the volume of tire rubber segments from a volume of steel wire and a volume of textile fiber within the set of tires; and, within a secondary tire shredder proximal the primary tire shredder, shredding the volume of tire rubber segments, each tire rubber segment within the volume of tire rubber segments comprising a desired surface area within a range of accepted surface areas configured to pyrolyze substantially uniformly into the volume of carbonaceous material, a volume of oil, and a volume of gas during thermal decomposition.

3. The method of claim 1, wherein thermally depolymerizing the volume of tire rubber segments comprises thermally depolymerizing the volume of tire rubber segments into a volume of carbonaceous material comprising agglomerates of carbonaceous aggregates, the agglomerates of carbonaceous aggregates defining a matrix structure of organic materials and inorganic materials, wherein:

the organic materials are derived from carbon black grades within the tire rubber segments, and the inorganic materials comprise a set of rubber additives extracted from the tire rubber segments.

4. The method of claim 3, wherein selecting the set of tires comprises selecting the set of tires to achieve a threshold percentage of inorganic materials within the matrix.

5. The method of claim 4, wherein the threshold percentage of inorganic materials comprises a threshold percentage of sulfur by weight less than twenty percent.

6. The method of claim 1, further comprising drying the set of pellets, within a dryer, to a particular moisture content defined as less than two percent moisture by weight.

7. The method of claim 6, further comprising:

separating a set of high moisture content pellets that exceed the particular moisture content from the set of pellets;

milling the set of high moisture content pellets into a powder; and within the mixer, mixing the powder with the volume of carbonaceous material.

8. The method of claim 1, wherein the maximum pellet size is proportional to a maximum pellet hardness defined by a desired dispersion coefficient of the set of pellets when mixed with a volume of rubber polymer.

9. The method of claim 1, further comprising removing a second subset of pellets smaller than a minimum pellet size from the set of pellets, the minimum pellet size larger than a maximum particle size of carbon in the volume of carbonaceous material, the maximum particle size proportional to a particle size of a largest grade of carbon black in the tire rubber segments.

10. The method of claim 1, wherein said set of tires comprises car tires and truck tires in a ratio of 5 to 1.

11. The method of claim 1, wherein said set of tires comprises car tires and truck tires in a ratio of 2 to 1.

12. The method of claim 11, wherein said set of tires is selected to limit the silica content in the carbonaceous material to less than 5% by weight.

13. The method of claim 1, the volume of carbonaceous material exhibit a recovered carbon surface activity that is distinct from each of:

a carbon surface activity of carbon black grades from the car tires, and a carbon surface activity of second set of virgin carbon black grades from the truck tires.

14. A method for converting tires into pelletized, recovered carbon black comprising:

shredding a set of tires into a volume of tire rubber segments, the set of tires consisting of agricultural tires, commercial vehicle tires, and passenger tires according to a specified tire ratio wherein the at least one agriculture tire comprises a first mixture of carbon black grades and inorganic materials, the at least one commercial vehicle tire comprises a second mixture of carbon black grades and inorganic materials, and the at least one passenger tire comprises a third mixture of carbon black grades and inorganic materials, wherein the first mixture is distinct from the second mixture and the third mixture, and wherein the specified tire ratio is selected to limit sulfur content in the volume of tire rubber segments to less than twenty percent by weight;

in a pyrolytic reactor, thermally depolymerizing the volume of tire rubber segments, within an inert atmosphere, into a set of pyrolytic byproducts comprising a volume of carbonaceous material exhibiting composite properties of carbon black grades extracted from the set of tires;

within a pelletizing system:

a. comminuting the volume of carbonaceous material to reduce a diameter of an agglomerate within the volume of carbonaceous material to less than a maximum agglomerate diameter;

b. within a mixer:

i. spraying the volume of carbonaceous material with a binding agent; and ii. mixing the volume of carbonaceous material over a first interval, the mixer inducing formation of a set of pellets of a range of pellet diameters, the first interval defined by a feed rate of a retort within the mixer and a length of the mixer;

c. drying the set of pellets within a dryer to a particular moisture content over a second interval defined by a rate the set of pellets translates across a length of the dryer and an operating temperature of the dryer, the rate the set of pellets translates across the length of the dryer defined by an angle between a plane of the length of the dryer and a horizontal plane;

d. removing from the set of pellets a first subset of pellets larger than a maximum pellet size.

15. The method of claim 14, wherein drying the set of pellets within the dryer comprises heating the set of pellets to the operating temperature to induce evaporation of moisture within the set of pellets to less than two percent moisture content.

16. The method of claim 14, wherein the maximum pellet size is proportional to a maximum pellet hardness defined by a desired dispersion coefficient of the set of pellets when mixed with a volume of rubber polymer.

17. The method of claim 14, further comprising removing a second subset of pellets from the set of pellets, the second subset of pellets smaller than a minimum pellet size and exceeding a maximum carbon particle size of carbon particles within the volume of carbonaceous material, the maximum carbon particle size defined by a particle size of a largest grade of carbon black in a set of carbon black grades within the volume of tire rubber.

18. The method of claim 14 further comprising feeding the volume of carbonaceous material into a magnetic separator configured to extract metallic remnants from the volume of carbonaceous material to reduce the inorganic content of the volume of carbonaceous material, the metallic remnants derived from steel wire within the set of tires.

19. The method of claim 14, wherein the volume of carbonaceous materials exhibitings a recovered carbon surface activity distinct from each of:
a carbon surface activity of the virgin carbon black grades in the first mixture;
a carbon surface activity of the virgin carbon black grades in the second mixture; and a carbon surface activity of the virgin carbon black grades in the third mixture.

* * * * *

UNITED STATES PATENT AND TRADEMARK OFFICE
CERTIFICATE OF CORRECTION

| | | |
|---|---|---|
| PATENT NO. | : 11,441,038 B2 | Page 1 of 1 |
| APPLICATION NO. | : 16/658049 | |
| DATED | : September 13, 2022 | |
| INVENTOR(S) | : William Anthony Wibbeler and Nathaniel Cole Murphy | |

It is certified that error appears in the above-identified patent and that said Letters Patent is hereby corrected as shown below:

In the Specification

Column 2, Line 1, delete "Silo" and replace it with -- S110 --.

Column 3, Line 28, delete "Moo" and replace it with -- N100 --.

Column 4, Line 41, delete "Moo" and replace it with -- N100 --.

Column 5, Line 29, delete "100" and replace it with -- 100 --.

Column 7, Line 28, delete "no" and replace it with -- 110 --.

Column 7, Line 33, delete "Silo" and replace it with -- S110 --.

Column 9, Line 5, delete "Silo" and replace it with -- S110 --.

Column 11, Line 13, delete "Boo" and replace it with -- 800 --.

Column 14, Line 19, delete "Moo" and replace it with -- N100 --.

Column 18, Line 21, delete "Silo" and replace it with -- S110 --.

Column 19, Line 20, delete "Sim" and replace it with -- S100 --.

Column 19, Line 27, delete "Sim" and replace it with -- S100 --.

Signed and Sealed this
Eighteenth Day of July, 2023

Katherine Kelly Vidal
*Director of the United States Patent and Trademark Office*